(12) United States Patent
Tanimura et al.

(10) Patent No.: US 10,781,928 B2
(45) Date of Patent: Sep. 22, 2020

(54) SPOOL VALVE

(71) Applicant: DENSO CORPORATION, Kariya, Aichi-pref. (JP)

(72) Inventors: Hiroshi Tanimura, Kariya (JP); Akira Takagi, Kariya (JP); Atsushi Motoki, Kariya (JP); Tsunehito Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/318,163

(22) PCT Filed: Jul. 18, 2017

(86) PCT No.: PCT/JP2017/025868
§ 371 (c)(1),
(2) Date: Jan. 16, 2019

(87) PCT Pub. No.: WO2018/016462
PCT Pub. Date: Jan. 25, 2018

(65) Prior Publication Data
US 2019/0249788 A1    Aug. 15, 2019

(30) Foreign Application Priority Data
Jul. 21, 2016    (JP) .................................. 2016-143409

(51) Int. Cl.
*F16K 11/07* (2006.01)
*F16K 3/24* (2006.01)

(52) U.S. Cl.
CPC ............ *F16K 11/0708* (2013.01); *F16K 3/24* (2013.01); *F16K 11/07* (2013.01)

(58) Field of Classification Search
CPC .................................................... F16K 11/0708
USPC ......................................... 137/625.67, 625.69
See application file for complete search history.

(56) References Cited

U.S. PATENT DOCUMENTS

| 3,198,212 | A |   | 8/1965 | Junck et al. |               |
|-----------|---|---|--------|--------------|---------------|
| 4,155,535 | A | * | 5/1979 | Seamone      | F16K 11/0708  |
|           |   |   |        |              | 137/625.3     |
| 8,939,173 | B2| * | 1/2015 | Yahr         | F16K 11/07    |
|           |   |   |        |              | 137/625.2     |

(Continued)

FOREIGN PATENT DOCUMENTS

| JP | S60-172784  | 9/1985  |
|----|-------------|---------|
| JP | 2001-271803 | 10/2001 |
| JP | 2004-176895 | 6/2004  |

(Continued)

*Primary Examiner* — Paul J Gray
(74) *Attorney, Agent, or Firm* — Nixon & Vanderhye P.C.

(57) ABSTRACT

A critical state is assumed in which a position of one end of the opening of the input port in the axial direction and a position of the other end of the groove in the axial direction accord with each other with respect to the axial direction. In the critical state, when a straight line is extended in the axial direction as well as radially outward of the spool without changing a direction of the straight line in a circumferential direction of the spool from one end of the groove bottom in the axial direction with the same inclination as the inclination of the groove bottom at the one end of the groove in the axial direction relative to the axial direction, the straight line passes through the opening of the output port to contact a wall surface of the output port.

15 Claims, 18 Drawing Sheets

(56) References Cited

U.S. PATENT DOCUMENTS

2002/0079002 A1 6/2002 Ueki
2007/0020895 A1 1/2007 Moriceau et al.

FOREIGN PATENT DOCUMENTS

| | | |
|---|---|---|
| JP | 2005-133880 | 5/2005 |
| JP | 2007-309459 | 11/2007 |
| JP | 2008-2663 | 1/2008 |
| JP | 2008-045678 | 2/2008 |
| JP | 2008-057746 | 3/2008 |
| JP | 2011-17381 | 1/2011 |
| JP | 2011-236964 | 11/2011 |
| JP | 2015-102150 | 6/2015 |
| WO | 80/00870 | 5/1980 |

* cited by examiner

AXIAL DIRECTION
THE OTHER SIDE ⟷ ONE SIDE

THE OTHER SIDE ⟵ AXIAL DIRECTION ⟶ ONE SIDE

AXIAL DIRECTION
THE OTHER SIDE ←→ ONE SIDE

SPOOL VALVE

CROSS REFERENCE TO RELATED APPLICATION

This application is the U.S. national phase of International Application No. PCT/JP2017/025868 filed Jul. 18, 2017, which designated the U.S. and claims priority to Japanese Patent Application No. 2016-143409 filed on Jul. 21, 2016, the entire contents of each of which are incorporated herein by reference.

TECHNICAL FIELD

The present disclosure relates to a spool valve including a spool that changes the communication state between an input port and an output port.

BACKGROUND ART

From the past, in order to regulate the oil pressure supplied to a friction element of a vehicular automatic transmission for example, such a spool valve as described above has been used. This spool valve includes a sleeve and a spool as follows for example. First, the sleeve includes an input port to which fluid flows in and an output port from which fluid flows out. At the inner circumferential surface of the sleeve, for example, the opening of the output port exists so as to depart to one side in the axial direction of the opening of the input port. Also, the spool is stored so as to be movable in the axial direction at the inner circumference of the sleeve, moves in the axial direction by a suction force generated by an electromagnetic solenoid for example, and changes the communication state of the input port and the output port.

Here, the spool includes a land with a large diameter which moves so as to be slidably in contact with the inner circumferential surface of the sleeve and opens/closes the opening of the input port. Also, in the spool, a shaft section having a diameter smaller than that of the land continues to one side in the axial direction of the land, and the opening of the output port is opened constantly to an internal space formed between the outer peripheral surface of the shaft section and the inner circumferential surface of the sleeve.

Further, the spool moves to the other side in the axial direction by a suction force of the electromagnetic solenoid to allow the land to open the opening of the input port to the internal space, and thereby the input port and the output port communicate with each other. Also, the energization amount of the electromagnetic solenoid is controlled, the position in the axial direction of the spool (namely the communication state between the input port and the output port) is operated, and the pressure of the fluid flowing out from the output port is regulated (the internal space may be hereinafter referred to as an output chamber. Further, the pressure of the fluid flowing out from the output port may be referred to as an output pressure).

Also, in the sleeve, a drain port for extracting the fluid from the supply destination of the fluid pressure exists on one side in the axial direction of the output port. In the spool, separately from the land that opens/closes the opening of the input port, a land that opens/closes the opening of the drain port continues to one side in the axial direction of the shaft section (the lands that open/close respective openings of the input port and the drain port may be hereinafter referred to as a first land and a second land). Therefore, the output chamber is separated on the other side and one side in the axial direction respectively by the first and second lands.

In the meantime, in the spool valve, in order to suppress the self-excited vibration of the spool at the time of regulating the output pressure, a notch is arranged in the first land. Therefore, the fluid having passed the notch and flowed in to the internal space collides on the second land and exerts a force to the spool, the force opposing the suction force of the electromagnetic solenoid. Also, in the output chamber, the fluid having flowed in from the input port flows out from the output port with the flow direction being changed by the spool. Therefore, as a reaction to that the spool exerts a force to the fluid and changes the flow direction, the fluid exerts a force to the spool, and this force also is applied to the spool so as to oppose the suction force of the electromagnetic solenoid.

As a result, there is a problem that the motion of the spool valve is not stable when the input port and the output port communicate with each other (hereinafter, a force exerted to the spool by the fluid having flowed in to the output chamber so as to oppose the suction force of the electromagnetic solenoid is referred to as a flow force). Also, such a structure is known that a constriction shape is arranged in the shaft section of the spool in order to suppress the flow force and stabilize the motion of the spool valve (refer to Patent Document 1 for example).

In Patent Document 1, it is stated that, by changing the flow direction of the fluid outward in the radial direction by the constriction shape, collision of the fluid on the second land is suppressed (that is, the flow force is reduced), and the motion of the spool valve can be stabilized. On the other hand, Patent Document 2 discloses a structure for suppressing the flow force without using a constriction shape. In other words, Patent Document 2 discloses first and second configurations as described below in order to further enhance the flow force suppression effect beyond the limit of the flow force suppression effect that is generated by limitation of the flow-in angle and the flow-out angle in the constriction shape when the constriction shape is used.

That is, according to the first configuration of Patent Document 2, a notch is arranged so that a turning flow is generated around the shaft of the spool in the output chamber. The fluid having flowed in to the output chamber thereby reduces the velocity while turning with the dynamic pressure being converted to the static pressure, and flows in to the output port. It is stated further that, therefore, the fluid can be suppressed from exerting a force to the spool in the axial direction and the flow force can be suppressed. Also, according to the second configuration of Patent Document 2, a through hole is arranged in the shaft section, and the flow of the fluid is made to run into each other inside the through hole. The fluid having flowed in to the output chamber thereby reduces the velocity while running into each other with the dynamic pressure being converted to the static pressure, and flows in to the output port. It is stated further that, therefore, the fluid can be suppressed from exerting a force to the spool in the axial direction and the flow force can be suppressed.

PRIOR ART DOCUMENTS

Patent Documents

Patent Document 1: JP 2002-130494 A
Patent Document 2: JP 2007-309459 A

However, according to the configuration of Patent Document 2, although the flow velocity of the fluid is reduced in the output chamber, the fluid inside the output chamber collides on the second land, a load applied to the spool in the direction opposite to the suction force of the electromagnetic solenoid (may be hereinafter referred to as a static pressure load) possibly increases, and, as a result, the flow force suppression effect possibly lowers.

SUMMARY OF INVENTION

The present disclosure addresses the above issues. Thus, it is an objective of the present disclosure to suppress increase of the static pressure load, and to achieve further improvement of the flow force suppression effect.

To achieve the objective, a spool valve in a first aspect of the present disclosure includes a spool that is accommodated in a cylindrical space movably in its axial direction to change a communication state between an input port through which fluid flows in and an output port through which fluid flows out. The input port and the output port open into the cylindrical space. An opening of the output port and an opening of the input port exist away from each other in the axial direction on an inner wall surface that defines the cylindrical space. The spool includes a sliding contact section that moves in sliding contact with the inner wall surface to open or close the opening of the input port. The movement of the sliding contact section in the axial direction changes the communication state between the input port and the output port.

The spool further includes a small diameter section that has a smaller diameter than a diameter of the sliding contact section and that continues with the sliding contact section in the axial direction. The opening of the output port is opened into an internal space that is formed between an outer peripheral surface of the small diameter section and the inner wall surface. The sliding contact section make the opening of the input port open to the internal space by its movement in the axial direction, so that the input port and the output port communicate with each other.

The spool further includes a groove on its outer peripheral surface, the groove having a predetermined length in the axial direction and recessed radially inward of the spool. A groove bottom of the groove in a range on one side in the axial direction including one end of the groove in the axial direction is inclined to rise further radially outward of the spool toward the one side in the axial direction. The groove bottom of the groove in a range on the other side in the axial direction including the other end of the groove in the axial direction is inclined to rise further radially outward of the spool toward the other side in the axial direction. The other end of the groove in the axial direction exists at the sliding contact section.

A critical state is assumed in which a position of one end of the opening of the input port in the axial direction and a position of the other end of the groove in the axial direction accord with each other with respect to the axial direction. In the critical state, when a straight line is extended in the axial direction as well as radially outward of the spool without changing a direction of the straight line in a circumferential direction of the spool from one end of the groove bottom in the axial direction with the same inclination as the inclination of the groove bottom at the one end of the groove in the axial direction relative to the axial direction, the straight line passes through the opening of the output port to contact a wall surface of the output port (hereinafter, an event that the straight line described above comes up against the wall surface of the output port is referred to as "specific extension condition").

The flow of the fluid having flowed in from the input port to the internal space is thereby guided by the groove. Also, since the specific extension condition described above is fulfilled in the critical state, the fluid having flowed out from one end in the axial direction of the groove to one side in the axial direction becomes hard to collide on the second land, and comes to easily flow in to the output port. Therefore, increase of the static pressure load can be suppressed, and further improvement of the flow force suppression effect can be achieved (the details will be explained in the embodiment).

To achieve the objective, according to a spool valve in a second aspect of the present disclosure, the spool further includes another sliding contact section that moves in sliding contact with the inner wall surface on one side of the small diameter section in the axial direction, and another smaller diameter section having a smaller diameter than a diameter of the another sliding contact section on one side of the another sliding contact section in the axial direction. The opening of the output port is opened into an internal space that is formed between an outer peripheral surface of the another smaller diameter section and the inner wall surface. Another internal space is formed between the sliding contact section and the another sliding contact section. The spool makes the opening of the input port open to the another internal space by the movement of the sliding contact section to the other side in the axial direction, and makes the another internal space open to the internal space by the movement of the another sliding contact section to the other side in the axial direction, so that the input port and the output port communicate with each other.

The spool further includes a groove on its outer peripheral surface, the groove having a predetermined length in the axial direction and recessed radially inward of the spool. A groove bottom of the groove in a range on one side in the axial direction including one end of the groove in the axial direction is inclined to rise further radially outward of the spool toward the one side in the axial direction. The groove bottom of the groove in a range on the other side in the axial direction including the other end of the groove in the axial direction is inclined to rise further radially outward of the spool toward the other side in the axial direction. The other end of the groove in the axial direction exists at the sliding contact section.

A critical state is assumed in which a position of one end of the opening of the input port in the axial direction and a position of the other end of the groove in the axial direction accord with each other with respect to the axial direction. In the critical state, when a straight line is extended to the one side in the axial direction as well as radially outward of the spool without changing a direction of the straight line in a circumferential direction of the spool from one end of the groove bottom in the axial direction with the same inclination as the inclination of the groove bottom at the one end of the groove in the axial direction relative to the axial direction, the straight line contacts a region of a wall surface that defines the another internal space, the region configured by components other than the spool.

Thereby, in the spool valve that throttles the flow of the fluid in plural stages, the fluid heading from the input port to the output port, and regulates the output pressure, also in the throttle structure along the way, increase of the static pressure load can be suppressed and further improvement of the flow force suppression effect can be achieved similarly to the first aspect (the details will be explained in the embodiment).

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiments will be explained below. Also, it is needless to mention that the embodiments are for disclosing concrete examples, and that the present disclosure is not limited to the embodiments.

First Embodiment

Figure 1:
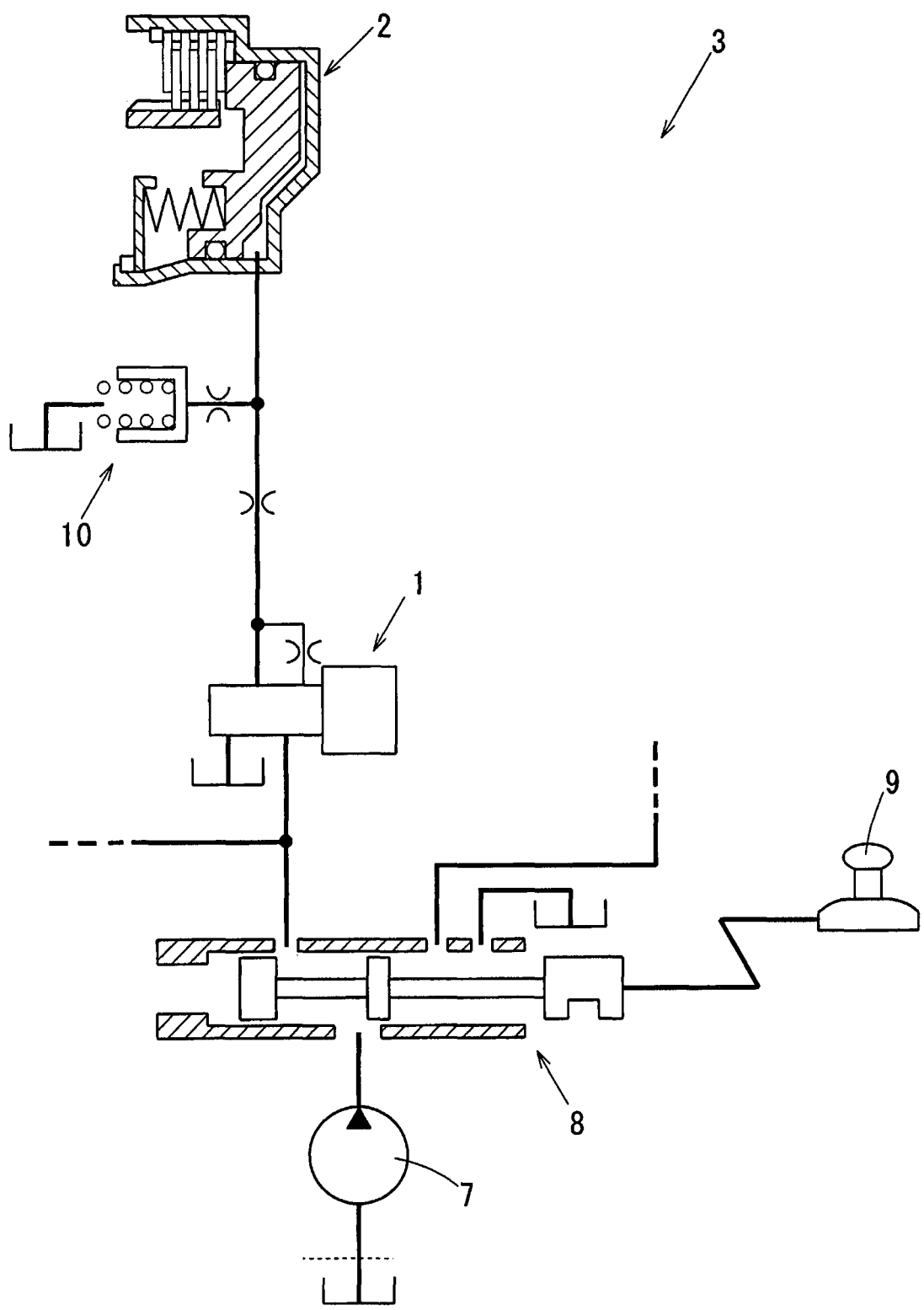
FIG. 1 is a configuration drawing of an oil pressure control device of a vehicular automatic transmission (first embodiment)
Figure 2:
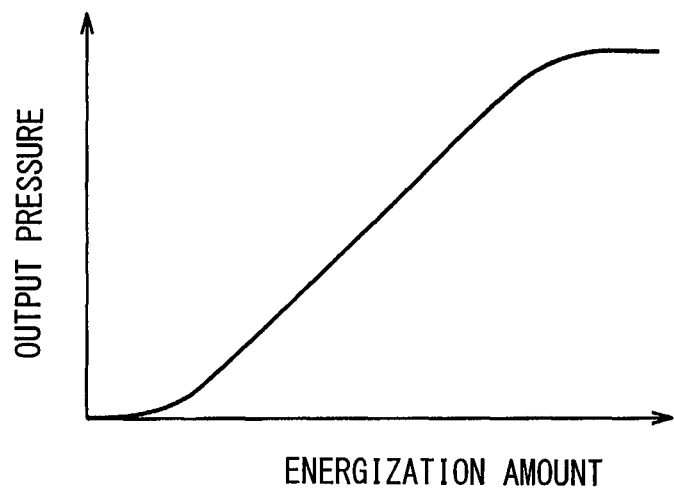
FIG. 2 is a correlation drawing between the energization amount of the electromagnetic solenoid and the output pressure (first embodiment)
Figure 3:
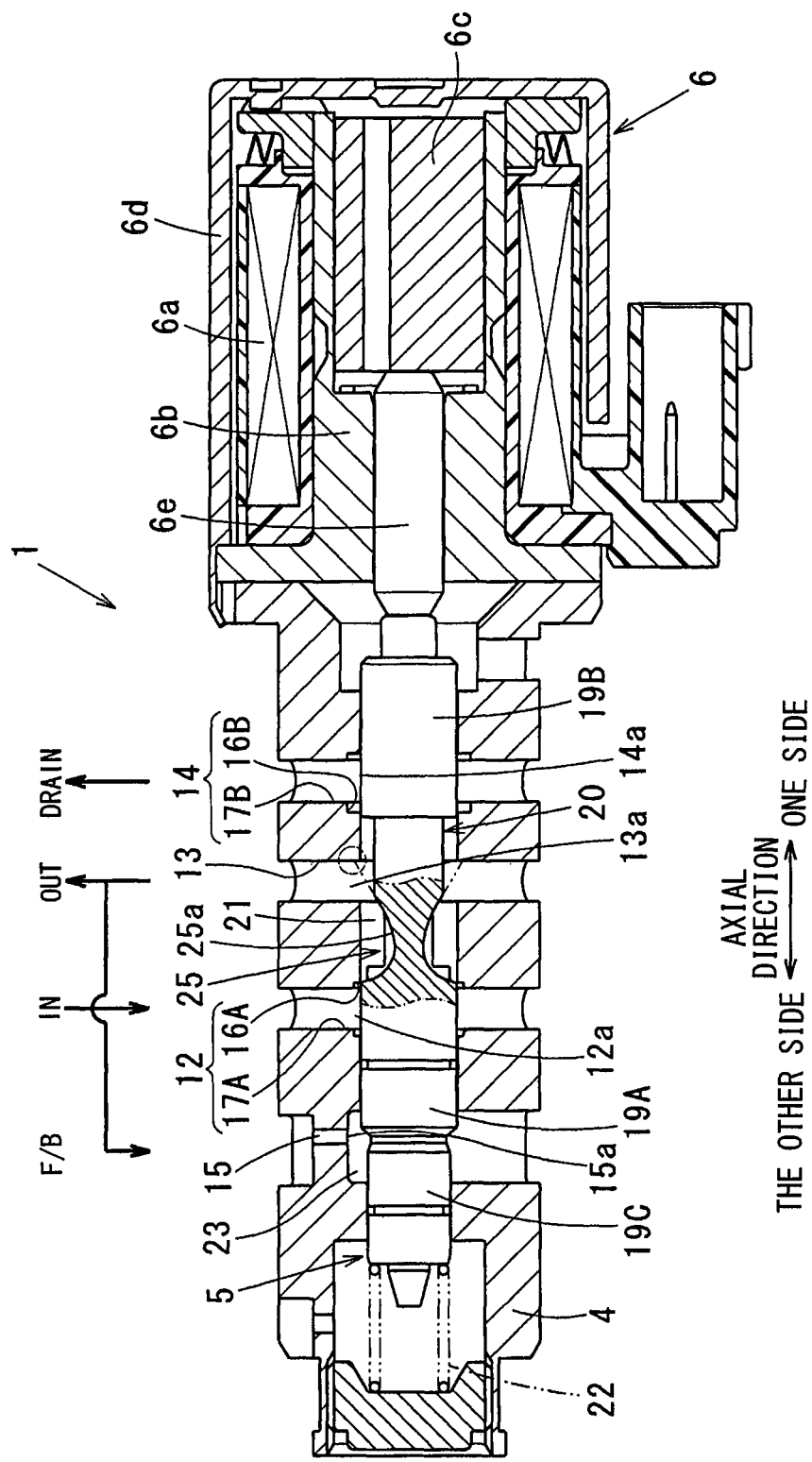
FIG. 3 is a cross-sectional view that shows the entire spool valve (first embodiment)
Figure 4A:
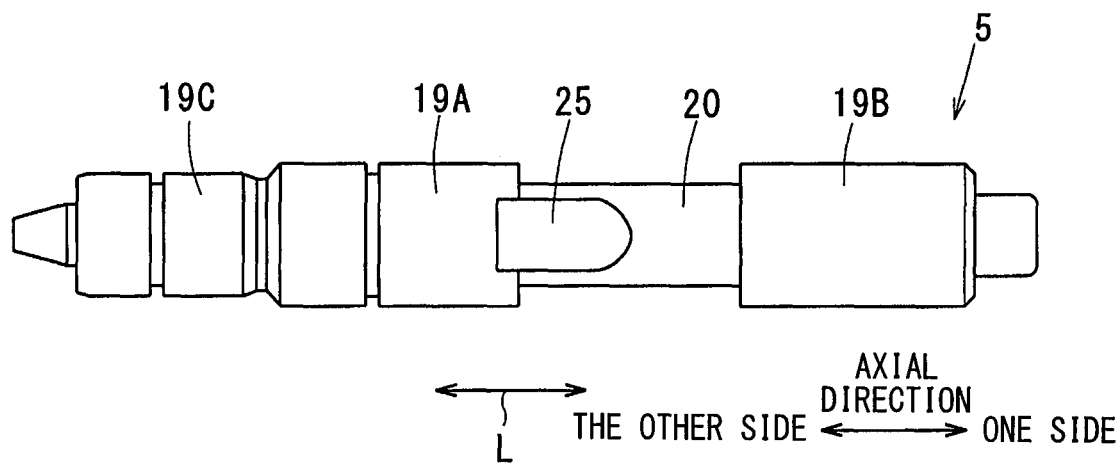
FIG. 4A is an overall view of the spool when the groove is viewed from right above (first embodiment)
Figure 4B:
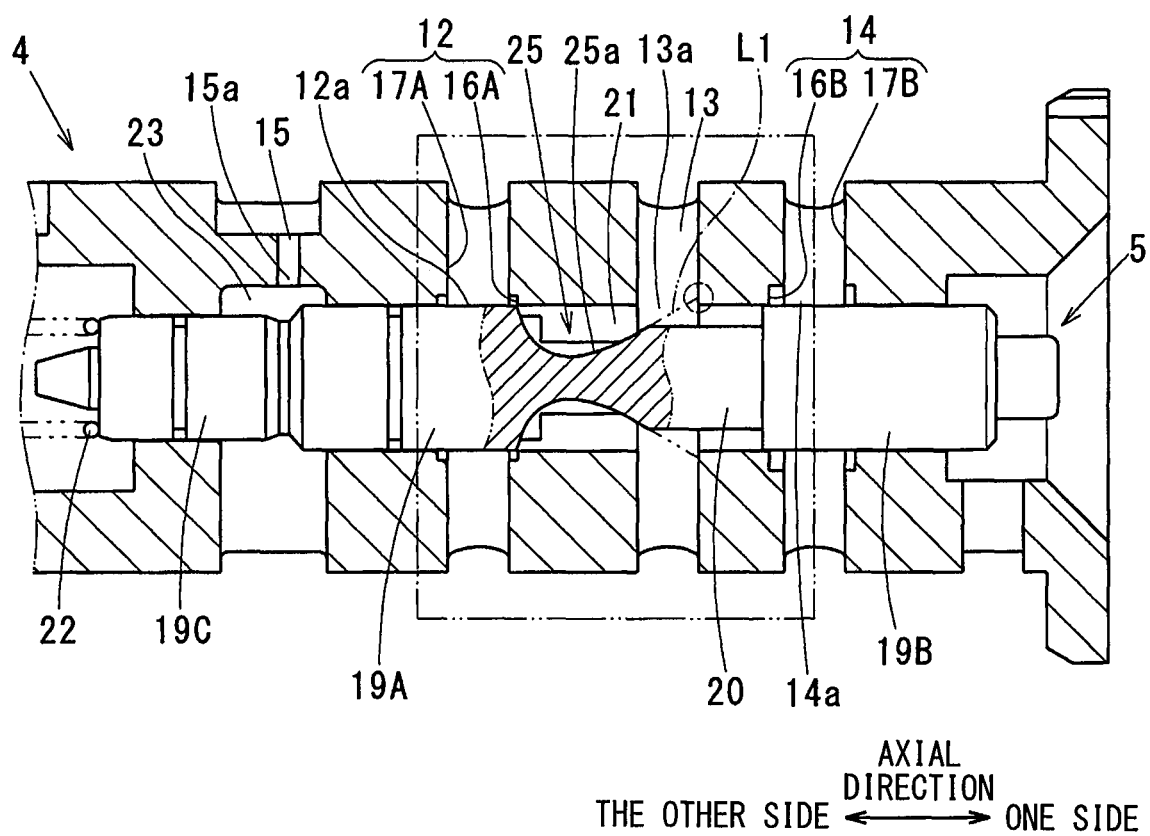
FIG. 4B is a cross-sectional view that shows a part of the spool valve (first embodiment)

A configuration of a first embodiment will be described. A spool valve 1 of the first embodiment is used for regulating the oil pressure supplied to a friction element 2 of a vehicular automatic transmission and configures an oil pressure control device 3 of the vehicular automatic transmission as shown in FIG. 1 for example, and is configured mainly of a sleeve 4, a spool 5, and an electromagnetic solenoid 6 (refer to FIG. 3).

Also, the oil pressure control device 3 includes a hydraulic pump 7, a manual valve 8, and the like in addition to the spool valve 1. Here, the hydraulic pump 7 is a known mechanical pump driven by the torque of an internal combustion engine for example, and the manual valve 8 has a known configuration of switching the supply destination of the oil pressure between the friction element 2 for the D-range and the friction element 2 for the R-range by operation of a shift lever 9 by an occupant for example.

Also, a known damper 10 is connected to a position between the spool valve 1 and the friction element 2. Further, in the spool valve 1, the energization amount of the electromagnetic solenoid 6 is controlled by a predetermined electronic control unit (not illustrated), and the oil pressure (output pressure) supplied to the friction element 2 is regulated by controlling the energization amount. Below, the spool valve 1 will be explained in detail using FIG. 3 to FIG. 6.

First, the sleeve 4 is arranged in a cylindrical shape, and includes an input port 12, an output port 13, a drain port 14, and an F/B port 15. Here, the input port 12 is a port to which the fluid flows in, is connected to the discharge side of the manual valve 8 in the oil pressure control device 3, and is utilized for receiving the hydraulic oil discharged from the hydraulic pump 7 to the inside of the spool valve 1. Also, the output port 13 is a port from which the fluid flows out, is connected to the friction element 2, and is utilized for supplying the hydraulic oil whose pressure has been regulated in the inside of the spool valve 1 to the friction element 2.

Further, the drain port 14 is connected to a drain destination such as an oil pan, and is utilized for extracting the hydraulic oil from the friction element 2. Also, the F/B port 15 is utilized for returning a part of the hydraulic oil discharged from the output port 13 to the inside of the spool valve 1 again, and for feedback-controlling the oil pressure outputted from the output port 13 (output pressure). Further, at the inner circumferential surface of the sleeve 4, the openings of these four ports are arranged in the order of the F/B port 15, input port 12, output port 13, and drain port 14 toward one side in the axial direction.

Also, at the inner circumferential surface of the sleeve 4, two recesses 16A, 16B that are recessed outward in the radial direction exist so as to be apart from each other in the axial direction. Further, the input port 12 includes the recess 16A on the other side in the axial direction and a tubular passage 17A that is connected to the recess 16A and makes the outer circumference side of the sleeve 4 and the inside of the recess 16A communicate with each other. Also, an opening 12a of the input port 12 is formed by the innermost circumference of the recess 16A. Further, the drain port 14 includes the recess 16B on one side in the axial direction and a tubular passage 17B that is connected to the recess 16B and makes the outer circumference side of the sleeve 4 and the inside of the recess 16B communicate with each other. Also, an opening 14a of the drain port 14 is formed by the innermost circumference of the recess 16B.

Next, the spool 5 is stored in the inner circumference of the sleeve 4 so as to be movable in the axial direction, and moves in the axial direction by a suction force generated by the electromagnetic solenoid 6 to change the communication state between the input port 12 and the output port 13. Also, the spool 5 includes three lands 19A, 19B, and 19C that move so as to be slidably in contact with the inner circumferential surface of the sleeve 4. Further, the land 19A in the middle in the axial direction out of the three lands 19A to 19C opens/closes the opening 12a of the input port 12, and thereby the communication state between the input port 12 and the output port 13 changes.

Here, in the spool 5, a shaft section 20 having a smaller diameter compared to the land 19A continues to one side in the axial direction of the land 19A, and an opening 13a of the output port 13 is opened constantly to an internal space 21 that is formed between the outer peripheral surface of the shaft section 20 and the inner circumferential surface of the sleeve 4. Also, the spool 5 moves to the other side in the axial direction by the suction force of the electromagnetic solenoid 6, the land 19A opens the opening 12a of the input port 12 to the internal space 21, and thereby the input port 12 and the output port 13 communicate with each other. Further, the energization amount of the electromagnetic solenoid 6 is controlled, the communication state between the input port 12 and the output port 13 is operated, and the oil pressure outputted from the output port 13 is regulated. From the above, the spool valve 1 is of a normally-close type in which the oil pressure is not outputted when the electromagnetic solenoid 6 is not energized (the internal space 21 may be hereinafter referred to as the output chamber 21).

Also, the land 19B existing on one side in the axial direction to the most out of the three lands 19A to 19C opens/closes the opening 14a of the drain port 14 with respect to the output chamber 21, and continues to one side in the axial direction of the shaft section 20. Therefore, the output chamber 21 changes the position in the axial direction accompanying movement of the spool 5 while the other side and one side in the axial direction are separated by the lands 19A and 19B respectively. Also, the lands 19A and 19B have the same diameter.

Further, to the other end in the axial direction of the spool 5, a spring 22 is set which urges the spool 5 to the direction opposite to the direction of the suction force of the electromagnetic solenoid 6 (namely to one side in the axial direction). Also, the spool 5 moves to one side in the axial direction by an urging force of the spring 22, the land 19B opens the opening 14a of the drain port 14 with respect to the output chamber 21, thereby the output port 13 and the drain port 14 communicate with each other, and the hydraulic oil is extracted from the friction element 2.

Also, the land 19C existing on the other side in the axial direction to the most out of the three lands 19A to 19C has a smaller diameter compared to the lands 19A and 19B. Further, a portion closer to one end in the axial direction inclusive of one end in the axial direction of the land 19C is stored in a separate internal space 23 along with a portion closer to the other end in the axial direction inclusive of the other end in the axial direction of the land 19A, the internal space 23 being formed on the other side in the axial direction of the output chamber 21, and an opening 15a of the F/B port 15 is opened constantly to the internal space 23 (hereinafter, the internal space 23 may be referred to as the F/B chamber 23).

Therefore, the hydraulic oil having flowed in to the F/B chamber 23 exerts a hydraulic force corresponding to the diameter difference of the lands 19A and 19C to one side in the axial direction of the spool 5, and the position in the axial direction of the spool 5 depends on the balance of the suction force of the electromagnetic solenoid 6, the urging force of the spring 22, and the hydraulic force of the F/B chamber 23. That is, the output pressure is returned to the F/B chamber 23 to be applied to the spool 5, thereby the position of the spool 5 is adjusted, and the output pressure is feedback-controlled. Also, the electromagnetic solenoid 6 has a known configuration of including a coil 6a, a fixed core 6b, a movable core 6c, a yoke 6d, an output shaft 6e, and the like.

The feature of the first embodiment will be described. The feature of the spool valve 1 of the first embodiment will be explained using FIG. 3 to FIG. 6. At the outer peripheral surface of the spool 5, a groove 25 exists which has a predetermined length in the axial direction and is recessed to the inner circumference side. Also, the other end in the axial direction of the groove 25 exists in the land 19A, and the groove 25 stretches over the land 19A and the shaft section 20. Therefore, a portion existing in the land 19A out of the groove 25 constitutes a notch for suppressing the self-excited vibration of the spool 5 at the time of regulating the output pressure.

Also, out of the groove 25, in a range on one side in the axial direction inclusive of one end in the axial direction, a groove bottom 25a inclines so as to rise to the outer circumference side as it goes to one side in the axial direction, and, in a range on the other side in the axial direction inclusive of the other end in the axial direction, the groove bottom 25a inclines so as to rise to the outer circumference side as it goes to the other side in the axial direction. Further, the groove bottom 25a smoothly continues as a whole while curving so that one side and the other side in the axial direction rise to the outer circumference side. Also, with respect to the groove 25, the longitudinal direction L as viewed from the top is parallel to the axial direction of the spool 5 (refer to FIG. 4A), and the groove bottom 25a appears to be a straight line when the groove bottom 25a is viewed from a cross section perpendicular to the axial direction. With such a configuration, the opening 12a of the input port 12 is opened to the output chamber 21 through the groove 25 by movement of the land 19A to the other side in the axial direction, and the hydraulic oil flows in from the input port 12 to the output chamber 21 through the groove 25. Here, an inclination angle of the groove 25 at the other end in the axial direction of the groove 25 is equivalent to a flow-in angle θ1 in a mathematical expression 1 described below, and an inclination angle of the groove 25 at one end in the axial direction of the groove 25 is equivalent to a flow-out angle θ2 in the mathematical expression 1 described below (refer to FIG. 5).

Also, a critical state is assumed in which the position of one end in the axial direction of the opening 12a (namely one end in the axial direction of the recess 16A) and a position of the other end in the axial direction of the groove 25 agree to each other with respect to the axial direction. In the critical state, a specific extension condition described below is fulfilled. In other words, the specific extension condition corresponds to such a state that, when a straight line L1 is extended to one side in the axial direction and to the outer circumference side from one end in the axial direction of the groove bottom 25a with the same inclination as an inclination of the groove bottom 25a with respect to the axial direction at one end in the axial direction of the groove bottom 25a without changing the direction in the circumferential direction, the straight line L1 passes through the opening 13a of the output port 13 and comes up against the wall surface of the output port 13.

Actions and effects of the first embodiment will be described. The actions and effects of the spool valve 1 of the first embodiment will be explained using FIG. 3 to FIG. 6 and FIG. 20. Here, in explanation of the actions and effects, the flow force will be defined as follows. First, a force exerted to the spool 5 by the fluid so as to oppose the suction force of the electromagnetic solenoid 6 is defined to be a flow force, the fluid having flowed in to the output chamber 21. Also, a flow force generated accompanying a reaction exerted to the spool 5 by the fluid and a flow force generated by collision of the fluid on the land 19B are defined to be flow forces F1 and F2 respectively.

Also, in explanation of the actions and effects, as a reference example corresponding to the structure of Patent Document 1, a structure having a constriction shape 100 in a shaft section 107 of a spool 104 (refer to FIG. 20) is used. Further, in the reference example, it is intended to suppress collision of the fluid on a second land 106 (namely to reduce the flow force F2) by changing the flow direction of the fluid outward in the radial direction by the constriction shape 100 in an output chamber 108, and to stabilize the motion of the spool valve, and corresponds to the structure described in Patent Document 1.

Figure 20:
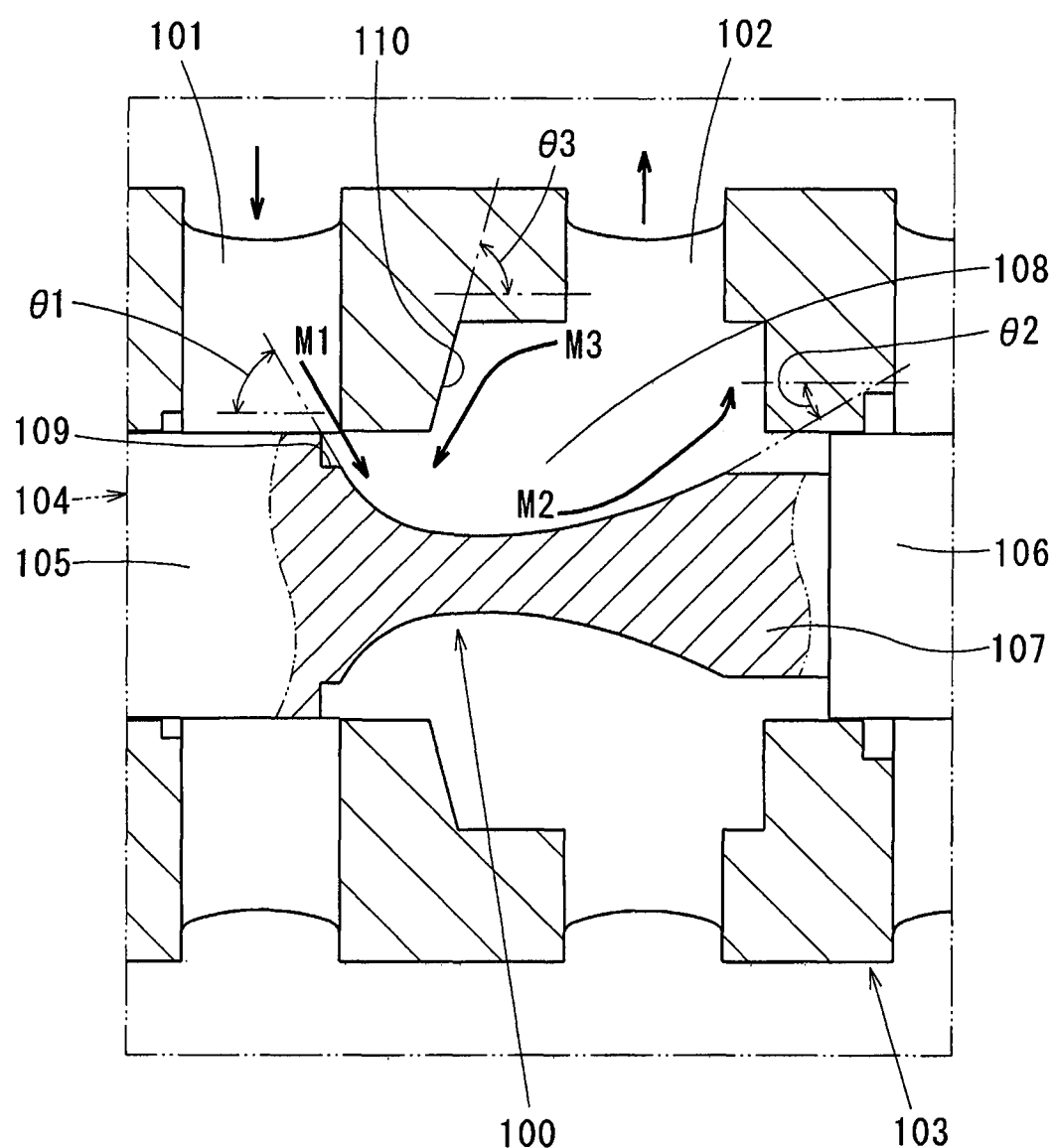
FIG. 20 is an explanatory drawing of a flow force F1 in a constriction shape (reference example).

In the meantime, the flow force F1 in the constriction shape 100 is obtained as a mathematical expression 1 below in a state an input port 101 and an output port 102 communicate with each other. Also, reference signs 103, 105, and 109 in FIG. 20 represent a sleeve, a first land, and a notch respectively.

$$F1 = \rho \cdot Q1 \cdot v1 \cdot \cos\theta1 - (\rho \cdot Q2 \cdot v2 \cdot \cos\theta2 + \rho \cdot Q3 v3 \cdot \cos\theta3) \quad [\text{Math. 1}]$$

In the mathematical expression 1, $\rho$ represents the density of the fluid. Also, Q1, v1, and $\theta1$ represent the flow amount, the flow velocity, and the flow-in angle respectively in a flow M1 on the flow-in side of the constriction shape 100, Q2, v2, and $\theta2$ represent the flow amount, the flow velocity, and the flow-out angle respectively in a flow M2 on the flow-out side of the constriction shape 100, and Q3, v3, and $\theta3$ represent the flow amount, the flow velocity, and the flow-in angle respectively in a return flow M3 from the flow-out side to the flow-in side of the constriction shape 100.

Also, the flow-in angle $\theta1$ can be defined for example to be an angle formed by a straight line and the shaft of the spool 104, the straight line being extended in the axial direction and to the outer circumference side with the same inclination as an inclination at the other end in the axial direction of the constriction shape 100 without changing the direction in the circumferential direction. Further, the flow-out angle $\theta2$ can be defined for example to be an angle formed by a straight line and the shaft of the spool 104, the straight line being extended in the axial direction and to the outer circumference side with the same inclination as an inclination at one end in the axial direction of the constriction shape 100 without changing the direction in the circumferential direction. Also, the returning flow-in angle $\theta3$ can be defined for example to be an angle formed by a straight line and the shaft of the spool 104, the straight line being extended in the axial direction and to the outer circumference side with the same inclination as an inclination at a wall surface 110 which largely affects the return flow M3 without changing the direction in the circumferential direction.

Therefore, according to the mathematical expression 1, in order to reduce the flow force F1 in the constriction shape 100, it is effective to reduce the term of $\rho \cdot Q1 \cdot v1 \cdot \cos\theta1$ (namely to increase the flow-in angle $\theta1$) and to increase the term of $\rho \cdot Q2 \cdot v2 \cdot \cos\theta2$ (namely to reduce the flow-out angle $\theta2$). Out of them, with respect to the flow-in angle $\theta1$, 69 degrees is the upper limit by the theoretical value of Mises.

On the other hand, with respect to the flow-out angle $\theta2$, as the flow-out angle $\theta2$ is smaller, although the flow force F1 can be reduced, the fluid becomes liable to collide on the second land 106, and increase of the flow force F2 becomes conspicuous. Therefore, in order to positively utilize the term of $\rho \cdot Q2 \cdot v2 \cdot \cos\theta2$ to lower the flow force F1, it is preferable to set the flow-out angle $\theta2$ so that increase of the flow force F2 can be suppressed as much as possible. Also, with respect to the term of $\rho \cdot Q3 \cdot v3 \cdot \cos\theta3$, the absolute value is smaller compared to other terms, and contribution to reduction of the flow force F1 is smaller.

However, according to the intensive studies by the present inventors, it has been found out that, even when the flow-out angle $\theta2$ is set to an optimum value, there is a case that the term of $\sigma \cdot Q2 \cdot v2 \cdot \cos\theta2$ cannot be utilized effectively for reduction of the flow force F1 because of "spill out" explained below. That is, the fluid having flowed in to the constriction shape 100 from a direction where the notch 109 exists does not head to a direction where the output port 102 exists in the constriction shape 100 but is spilled out to other directions to be dispersed. Accordingly, the flow velocity v2 drops, the fluid flowing toward the output port 102 along the flow-out angle $\theta2$ reduces, and therefore, as a result, the term of $\rho \cdot Q2 \cdot v2 \cdot \cos\theta2$ cannot be utilized effectively for reduction of the flow force F1.

Therefore, in order to further improve the flow force suppression effect than that by the constriction structure 100, the present inventors have continued intensive studies aiming to effectively utilize the term of $\sigma \cdot Q2 \cdot v2 \cdot \cos\theta2$ in the mathematical expression 1 to reduce the flow force F1 while suppressing increase of the flow force F2, and have conceived a structure of the present disclosure.

That is, according to the spool valve 1 of the first embodiment materializing the present disclosure, the groove 25 exists at the outer peripheral surface of the spool 5, and the other end in the axial direction of the groove 25 exists in the land 19A. Also, a critical state is assumed in which the position of one end in the axial direction of the opening 12a (namely one end in the axial direction of the recess 16A) and a position of the other end in the axial direction of the groove 25 agree to each other with respect to the axial direction. In the critical state, a specific extension condition described below is fulfilled. In other words, the specific extension condition corresponds to such a state that, when the straight line L1 is extended to one side in the axial direction and the outer circumference side from one end in the axial direction of the groove bottom 25a with the same inclination as an inclination of the groove bottom 25a with respect to the axial direction at one end in the axial direction of the groove bottom 25a without changing the direction in the circumferential direction, the straight line L1 passes through the opening 13a of the output port 13 and comes up against the wall surface of the output port 13.

Figure 5:
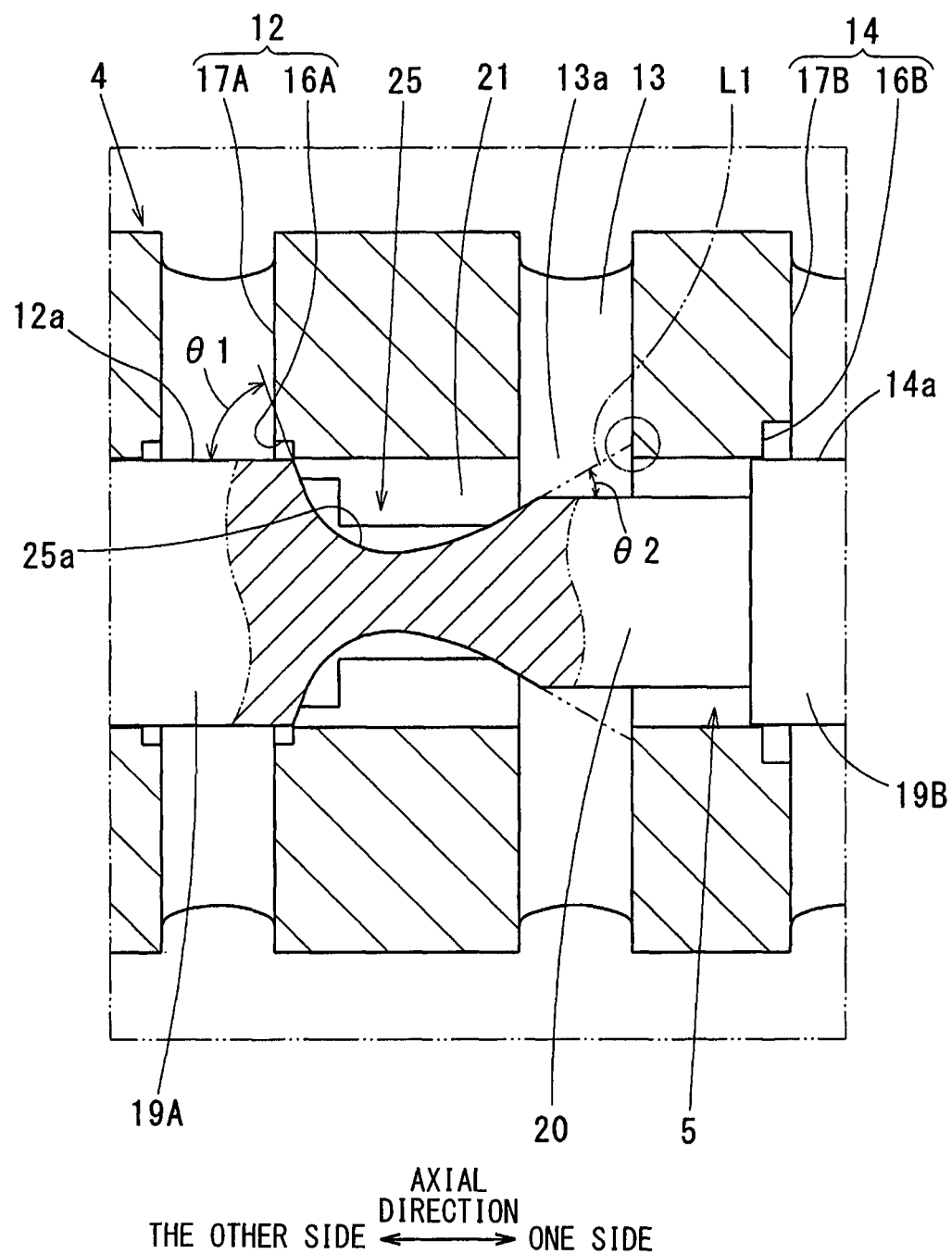
FIG. 5 is a partial enlarged view that shows an essential part of the spool valve (first embodiment)
Figure 6:
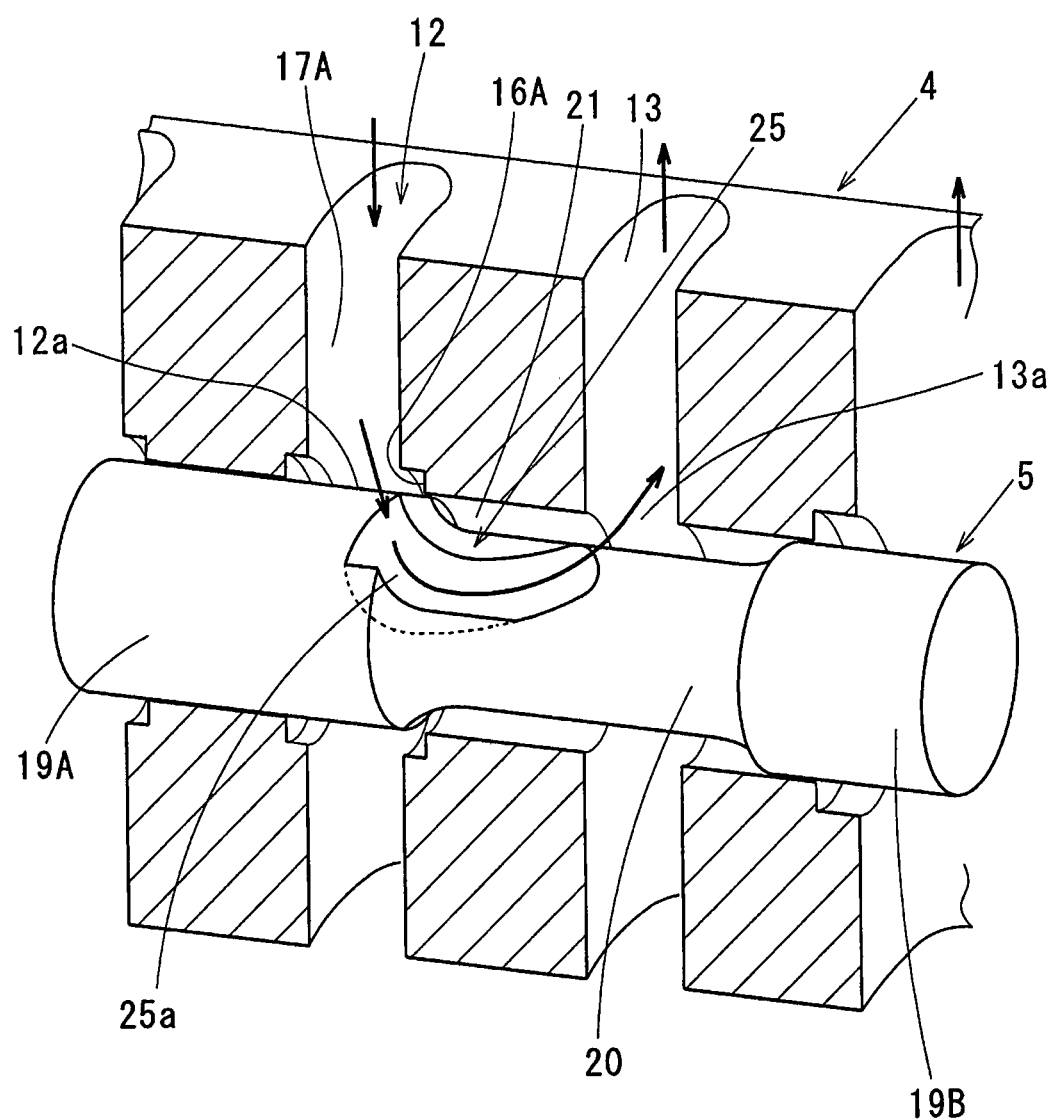
FIG. 6 is a partial perspective view that shows an essential part of the spool valve (first embodiment)

Also, the flow force F1 in the groove 25 is expressed similarly to the mathematical expression 1 described above in a state where the input port 12 and the output port communicate with each other. In this case, the flow-in angle θ1 can be defined to be an angle formed by a straight line and the outer peripheral surface of the spool 5, the straight line being extended in the axial direction and to the outer circumference side from the other end in the axial direction of the groove 25 with the same inclination as an inclination at the other end in the axial direction of the groove 25 without changing the direction in the circumferential direction as shown in FIG. 5. Also, the flow-out angle θ2 can be defined to be an angle formed by the straight line L1 and the outer peripheral surface of the spool 5.

The flow of the hydraulic oil having flowed in from the input port 12 to the output chamber 21 is thereby guided by the groove 25. Accordingly, since spilling out is suppressed, such phenomena can be suppressed that the flow velocity v2 in the mathematical expression 1 drops and that the fluid flowing toward the output port 13 along the flow-out angle θ2 reduces. As a result, the flow force F1 can be lowered utilizing the term of σ·Q2·v2·cos θ2 of the mathematical expression 1 effectively.

Also, since the specific extension condition described above is fulfilled in the critical state, the hydraulic oil having flowed out from one end in the axial direction of the groove 25 to one side in the axial direction comes to easily flow in to the output port 13. Therefore, since collision of the hydraulic oil on the land 19B can be suppressed, increase of the flow force F2 can be suppressed.

From the above, in the spool valve 1, the flow force F1 can be lowered utilizing the term of σ·Q2·v2·cos θ2 of the mathematical expression 1 effectively while suppressing increase of the flow force F2. Thereby, according to the spool valve 1 of the first embodiment, since the flow force suppression effect can be further improved than that by the constriction structure 100 equivalent to Patent Document 1, the flow force suppression effect can be enhanced even when the first and second configurations of Patent Document 2 described above (namely the configuration possibly increasing the static pressure load) are not used. Therefore, according to the spool valve 1 of the first embodiment, increase of the static pressure load can be suppressed, and further improvement of the flow force suppression effect can be achieved.

Second Embodiment

Figure 7A:
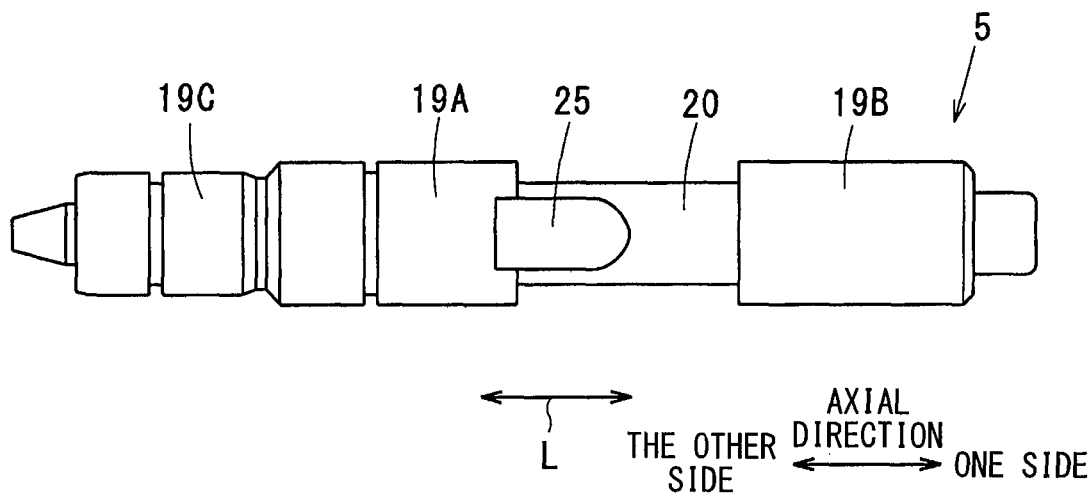
FIG. 7A is an overall view of the spool when the groove is viewed from right above (second embodiment)
Figure 7B:
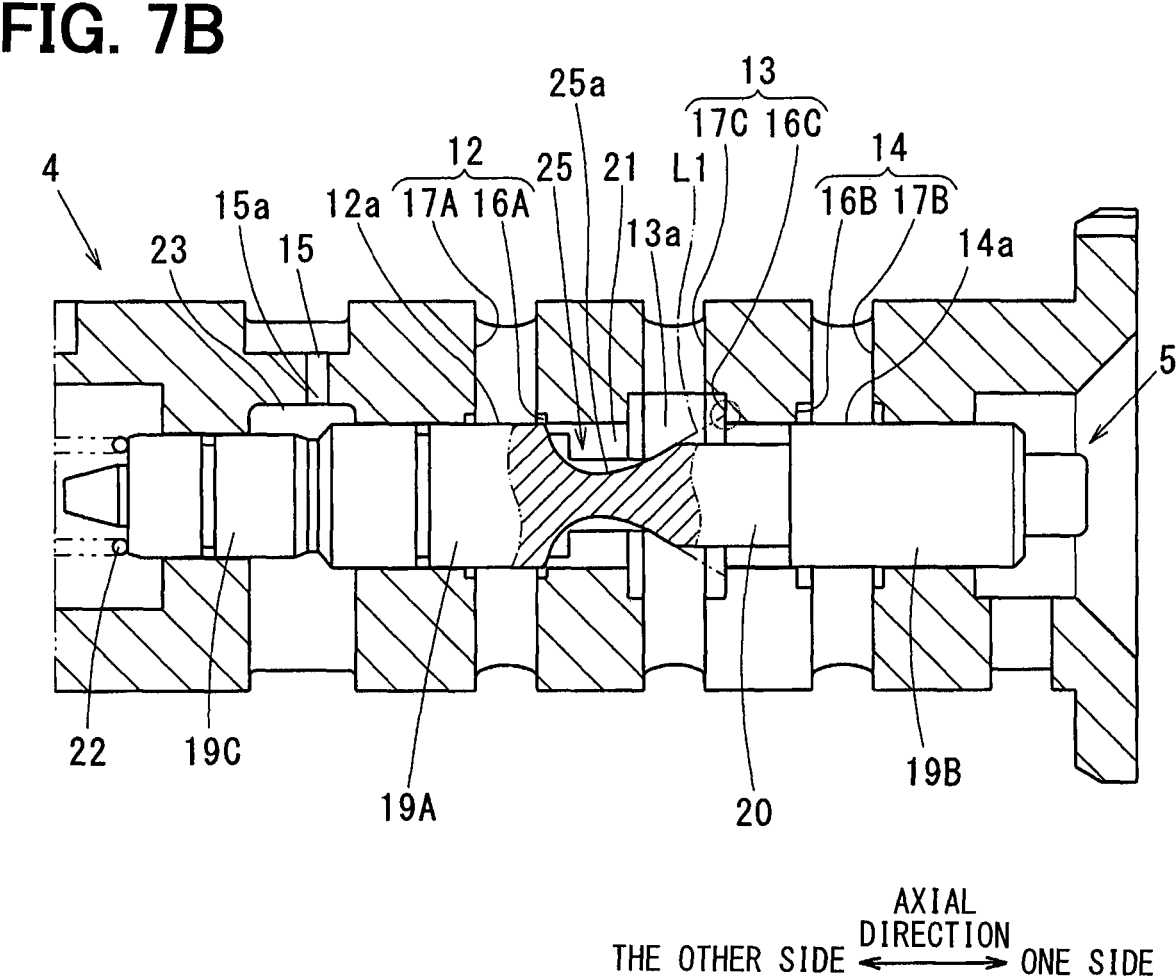
FIG. 7B is a cross-sectional view that shows a part of the spool valve (second embodiment)

The spool valve 1 of the second embodiment will be explained mainly focusing on a point different from the spool valve 1 of the first embodiment. According to the spool valve 1 of the second embodiment, as shown in FIG. 7, the output port 13 includes a recess 16C and tubular passages 17C described below. In other words, the recess 16C exists between the recess 16A and the recess 16B with respect to the axial direction, and the tubular passages 17C continue to the recess 16C and make the outer circumference side of the sleeve 4 and the inside of the recess 16C communicate with each other. Also, the opening 13a of the output port 13 is formed by the innermost circumference of the recess 16C. Further, two pieces of the tubular passages 17C exist to be apart from each other by 180° with respect to the circumferential direction, and continue to the recess 16C to be apart from each other by 180°.

Also, in a critical state, the straight line L1 comes up against the wall surface of the recess 16C. Therefore, in the spool valve 1 of the second embodiment, in the critical state, a specific extension condition is fulfilled by that the straight line L1 comes up against the wall surface of the recess 16C. Thereby, in the spool valve 1 of the second embodiment also, since the straight line L1 passes through the opening 13a of the output port 13 and comes up against the wall surface of the output port 13, the hydraulic oil having flowed out from the groove 25 comes to easily flow in to the output port 13, and actions and effects similar to those of the spool valve 1 of the first embodiment can be secured.

Third Embodiment

Figure 8A:
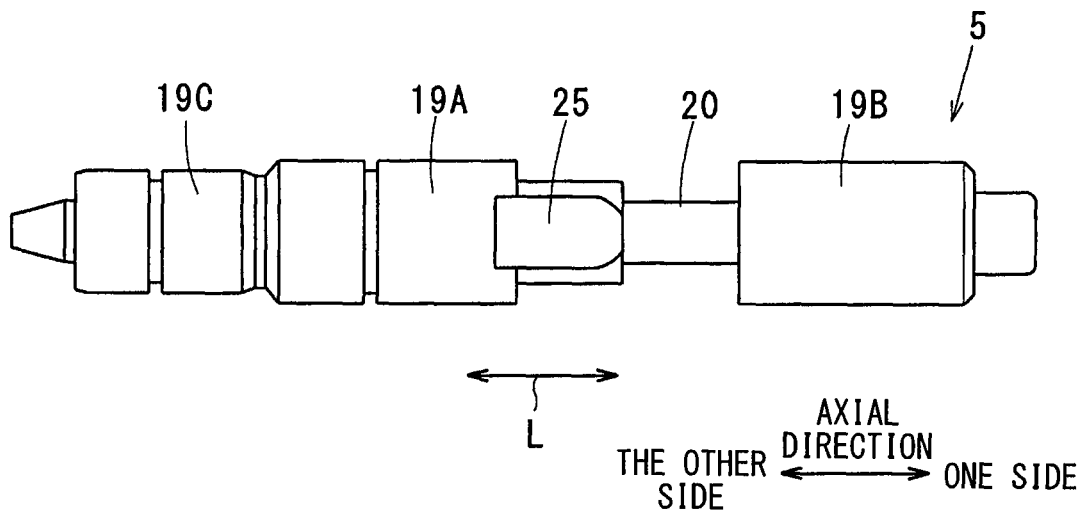
FIG. 8A is an overall view of the spool when the groove is viewed from right above (third embodiment)
Figure 8B:
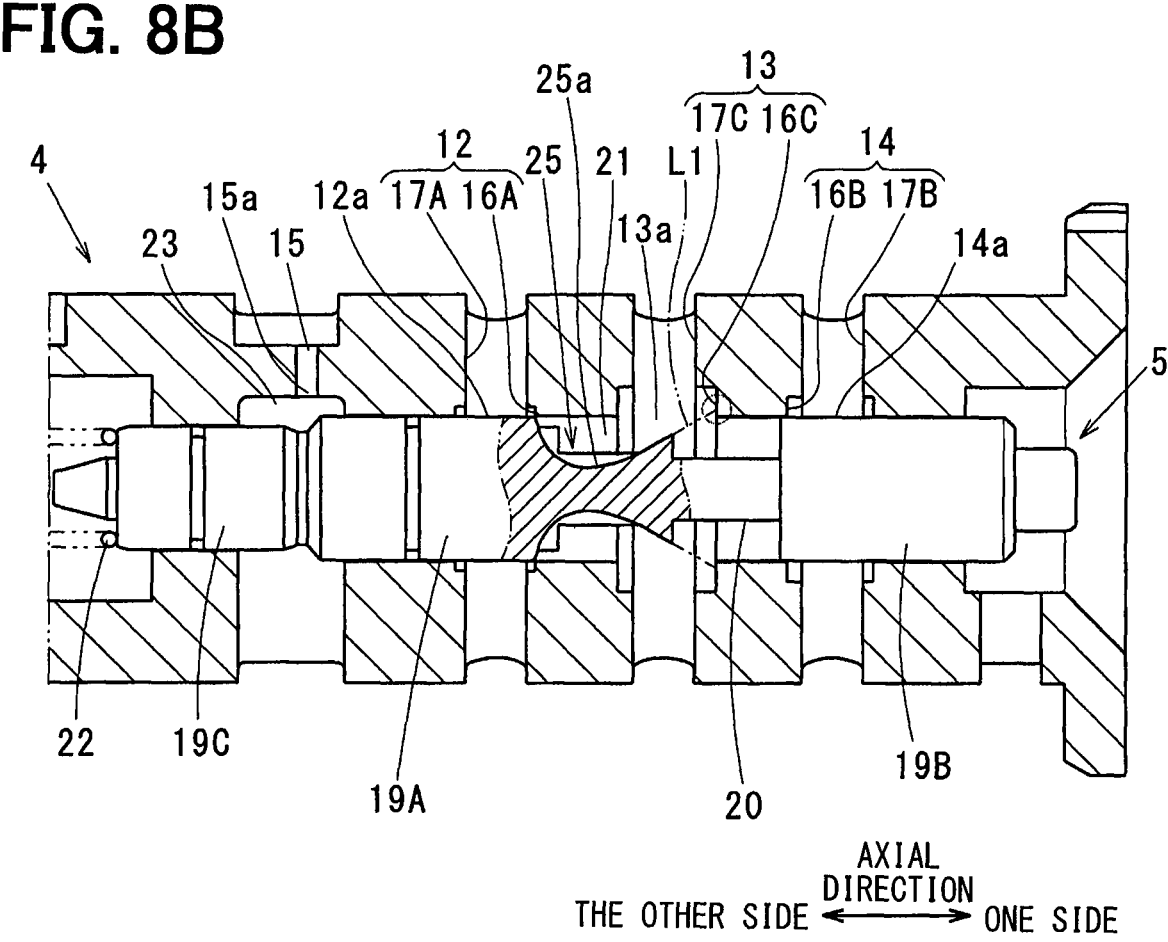
FIG. 8B is a cross-sectional view that shows a part of the spool valve (third embodiment)

The spool valve 1 of the third embodiment will be explained mainly focusing on a point different from the spool valve 1 of the first embodiment. According to the spool valve 1 of the third embodiment, as shown in FIG. 8A and FIG. 8B, the output port 13 is similar to that of the aspect of the second embodiment, and the specific extension condition is also similar to that of the aspect of the second embodiment. Also, the shaft section 20 of the third embodiment forms a step at one end in the axial direction of the groove 25 to be reduced in diameter. In other words, the shaft section 20 rises sheer to the inner circumference side at one end in the axial direction of the groove 25. Thereby, at one end in the axial direction of the groove 25, an angle formed by a surface that forms the step and the groove bottom 25a becomes an acute angle, and separation of a flow comes to be generated easily. Therefore, the hydraulic oil can be suppressed from flowing toward the land 19B from the groove 25. As a result, according to the spool valve 1 of the third embodiment, the flow force F2 can be suppressed further.

Fourth Embodiment

Figure 9A:
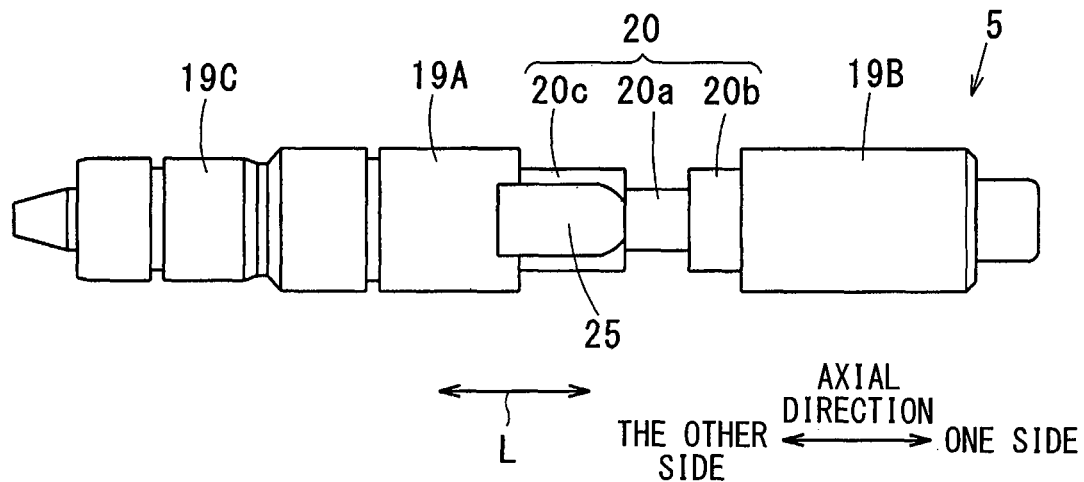
FIG. 9A is an overall view of the spool when the groove is viewed from right above (fourth embodiment)
Figure 9B:
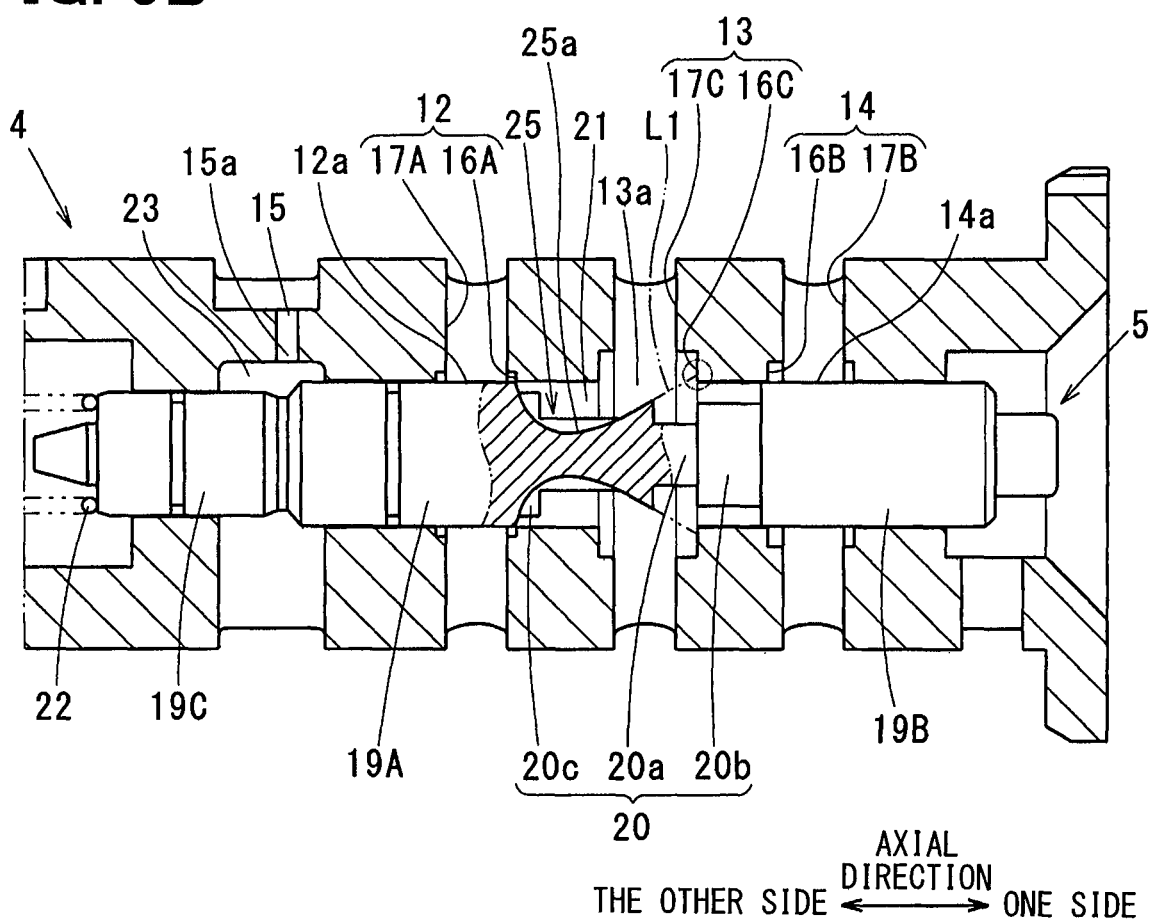
FIG. 9B is a cross-sectional view that shows a part of the spool valve (fourth embodiment)

The spool valve 1 of the fourth embodiment will be explained mainly focusing on a point different from the spool valve 1 of the first embodiment. According to the spool valve 1 of the fourth embodiment, as shown in FIG. 9A and FIG. 9B, the output port 13 is similar to that of the aspects of the second and third embodiments, and the specific extension condition is also similar to that of the aspects of the second and third embodiments. Also, the shaft section 20 of the fourth embodiment forms a step at one end in the axial direction of the groove 25 to be reduced in diameter similarly to the third embodiment. Further, according to the spool valve 1 of the fourth embodiment, out of the shaft section 20, a portion on one side in the axial direction from one end in the axial direction of the groove 25 includes first and second portions 20a and 20b described below.

That is, the first portion 20a has a smaller diameter compared to a portion 20c where the groove 25 exists, and continues to one end in the axial direction of the portion 20c. Also, the second portion 20b has a lager diameter compared to the first portion 20a and a smaller diameter compared to the land 19B, and continues to one end in the axial direction of the first portion 20a and to the other end in the axial direction of the land 19B. Thereby, the hydraulic oil having flowed in to a direction where the tubular passage 17C does not exist in the output chamber 21 comes to easily flow in to the output port 13 through a space sandwiched by the outer circumference of the first portion 20a and the recess 16C, and is suppressed from heading toward the land 19B. Therefore, according to the spool valve 1 of the fourth embodiment, the flow force F2 can be suppressed further.

Fifth Embodiment

Figure 10:
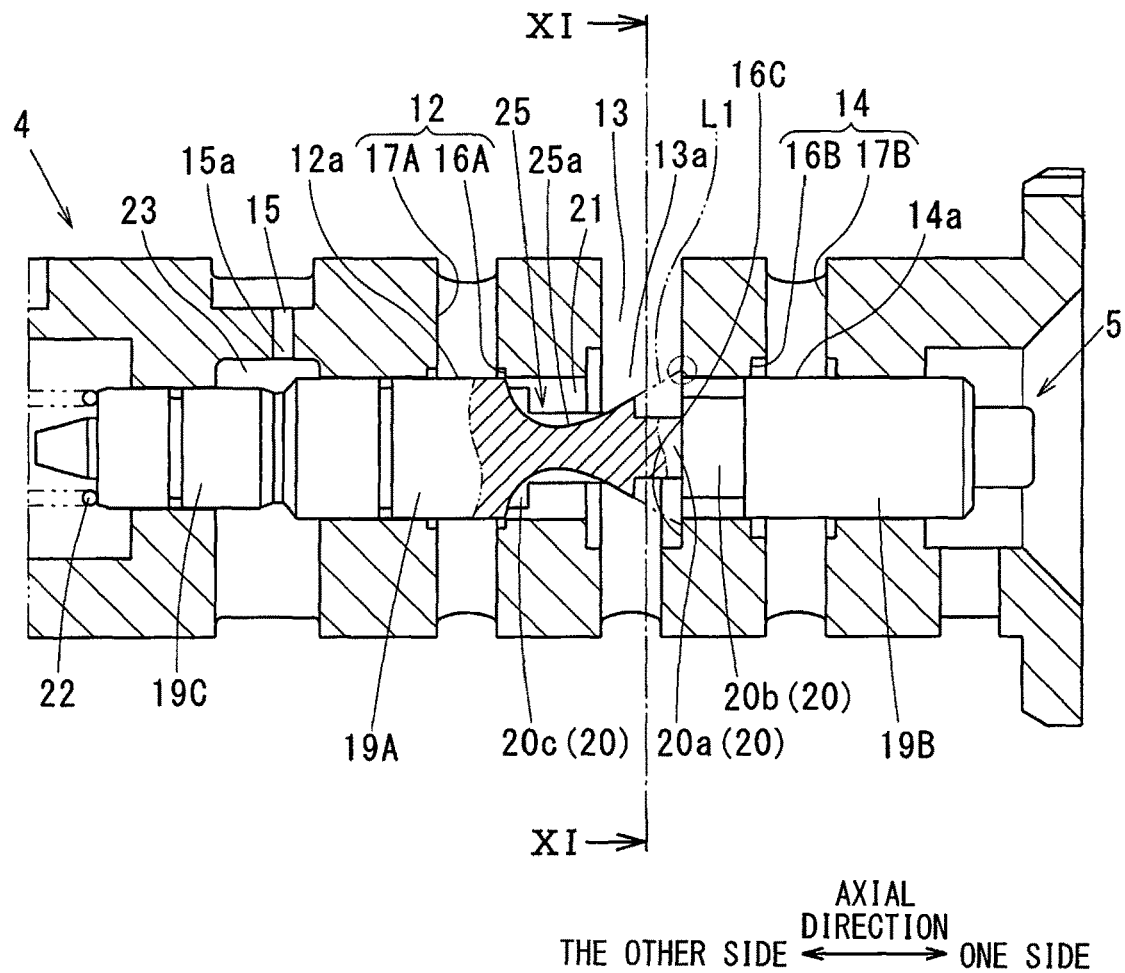
FIG. 10 is a cross-sectional view that shows a part of the spool valve (fifth embodiment)
Figure 11:
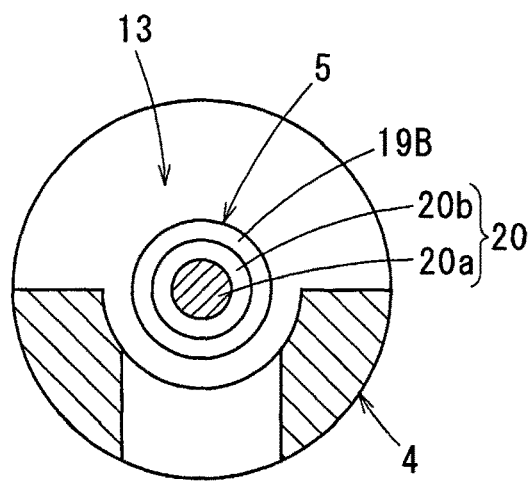
FIG. 11 is a XI-XI cross-sectional view of FIG. 10 (fifth embodiment)

The spool valve 1 of the fifth embodiment will be explained mainly focusing on a point different from the spool valve 1 of the first embodiment. According to the spool valve 1 of the fifth embodiment, as shown in FIG. 10 and FIG. 11, the specific extension condition is similar to that of the aspects of the second to fourth embodiments. Also, the shaft section 20 of the fifth embodiment is similar to that of the aspect of the fourth embodiment. Further, according to the spool valve 1 of the fifth embodiment, one output port 13 does not include the tubular passage 17C, spreads by 180° with respect to the circumferential direction, and penetratingly extends in the radial direction. Thereby, even when the spool 5 rotates around the axis, the flow of the hydraulic oil from the groove 25 can be guided to the output port 13 almost certainly, and therefore the flow force F2 can be lowered at a low cost.

Sixth Embodiment

Figure 12:
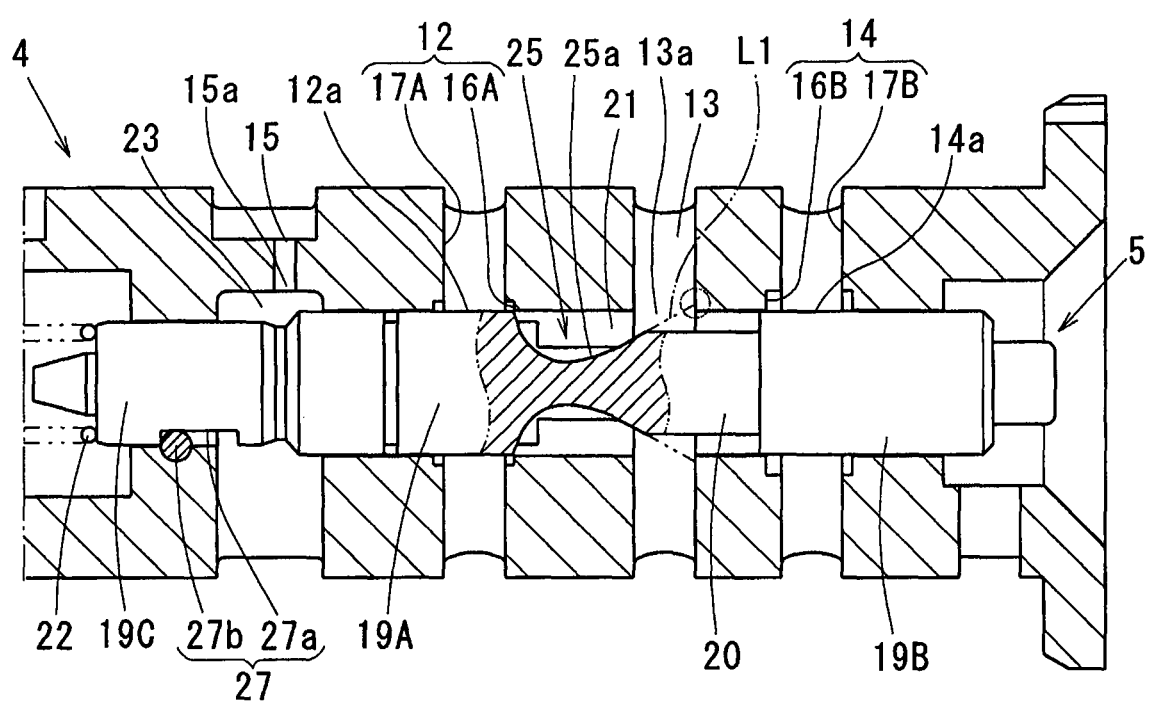
FIG. 12 is a cross-sectional view that shows a part of the spool valve (sixth embodiment)

The spool valve 1 of the sixth embodiment will be explained mainly focusing on a point different from the spool valve 1 of the first embodiment. As shown in FIG. 12, the spool valve 1 of the sixth embodiment includes a rotation restriction section 27 that restricts the spool 5 from relatively rotating in the circumferential direction with respect to the sleeve 4. Here, the rotation restriction section 27 is configured of a flat surface 27*a* arranged in the land 19C and a pin 27*b* inserted to the inner circumference of the sleeve 4. Thereby, since rotation of the spool 5 in the circumferential direction with respect to the sleeve 4 is restricted, positional shifting with respect to the circumferential direction between the groove 25 and the output port 13 is suppressed. Therefore, temporal variation of the lowering effect of the flow force F2 can be suppressed.

Seventh Embodiment

Figure 13A:
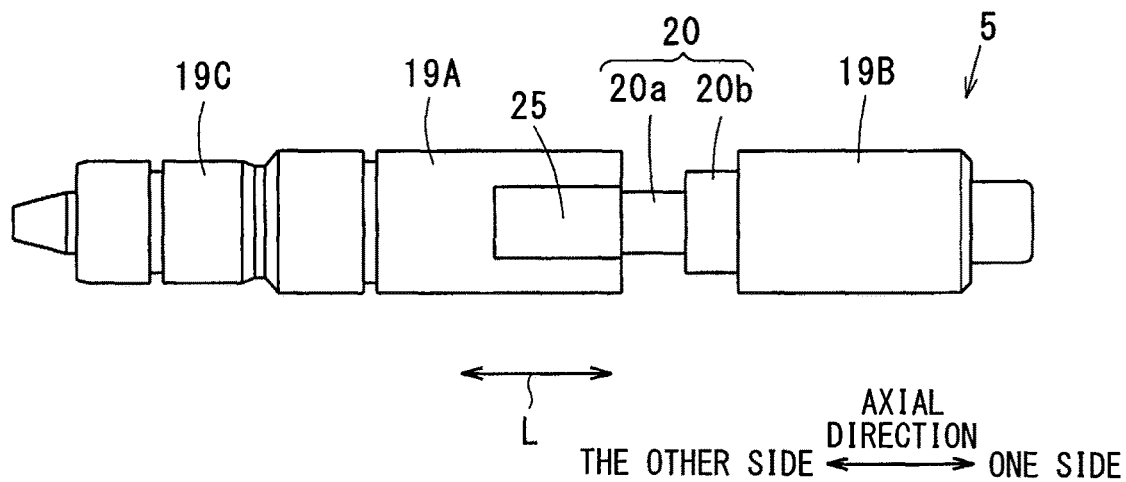
FIG. 13A is an overall view of the spool when the groove is viewed from right above (seventh embodiment)
Figure 13B:
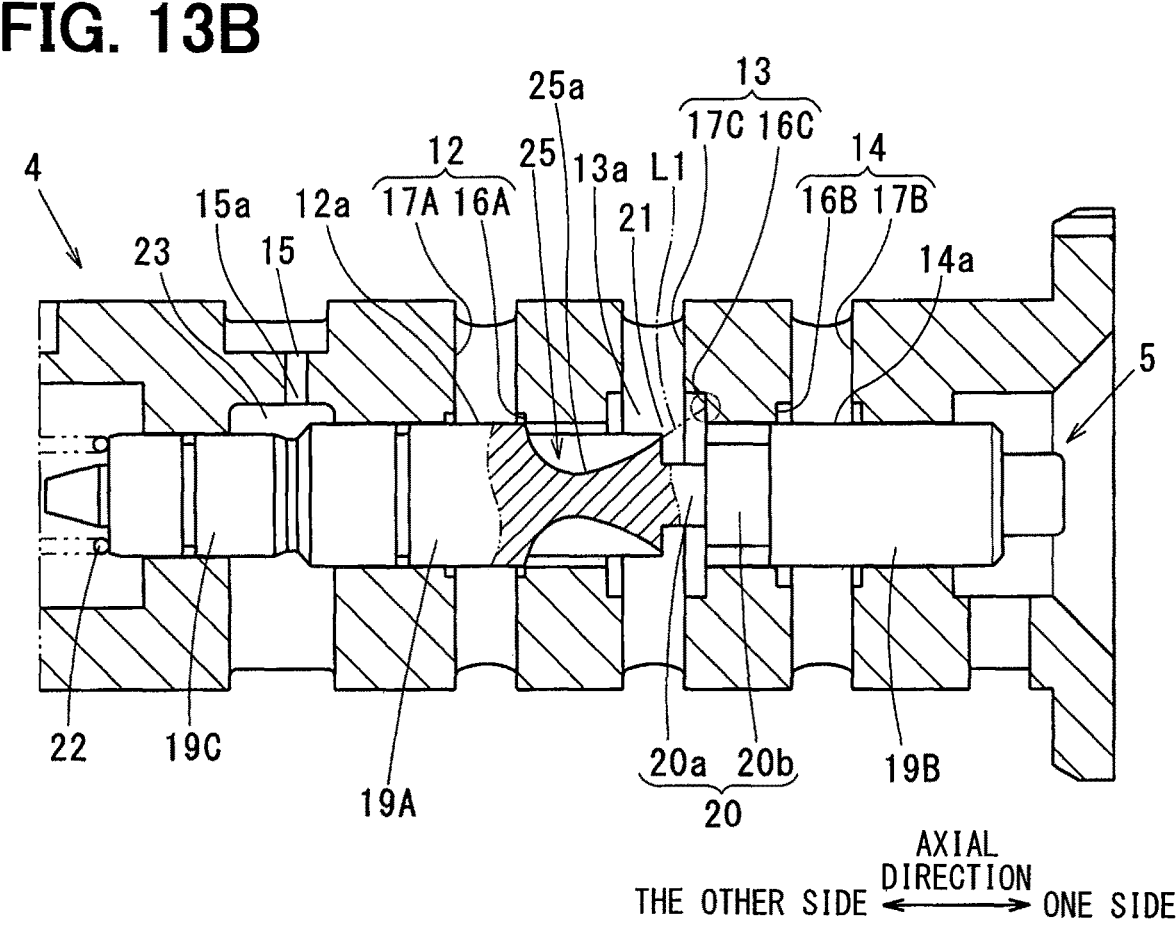
FIG. 13B is a cross-sectional view that shows a part of the spool valve (seventh embodiment)

The spool valve 1 of the seventh embodiment will be explained mainly focusing on a point different from the spool valve 1 of the first embodiment. According to the spool valve 1 of the seventh embodiment, as shown in FIG. 13A and FIG. 13B, the specific extension condition is similar to that of the aspects of the second-fifth embodiments. Also, according to the spool valve 1 of the seventh embodiment, the groove 25 exists only in the outer peripheral surface of the land 19A, and one end in the axial direction of the groove 25 exists at one end in the axial direction of the land 19A.

Further, the shaft section 20 of the seventh embodiment is configured of only the first and second portions 20*a*, 20*b* in the shaft section 20 of the fourth embodiment. Thereby, even when the spool 5 may be largely displaced to the other side in the axial direction, the input port 12 and the output chamber 21 communicate with each other only in the direction where the groove 25 exists, and do not communicate with each other in other directions. Therefore, spilling out can be further suppressed and the flow force F1 can be further lowered.

Eighth Embodiment

Figure 14:
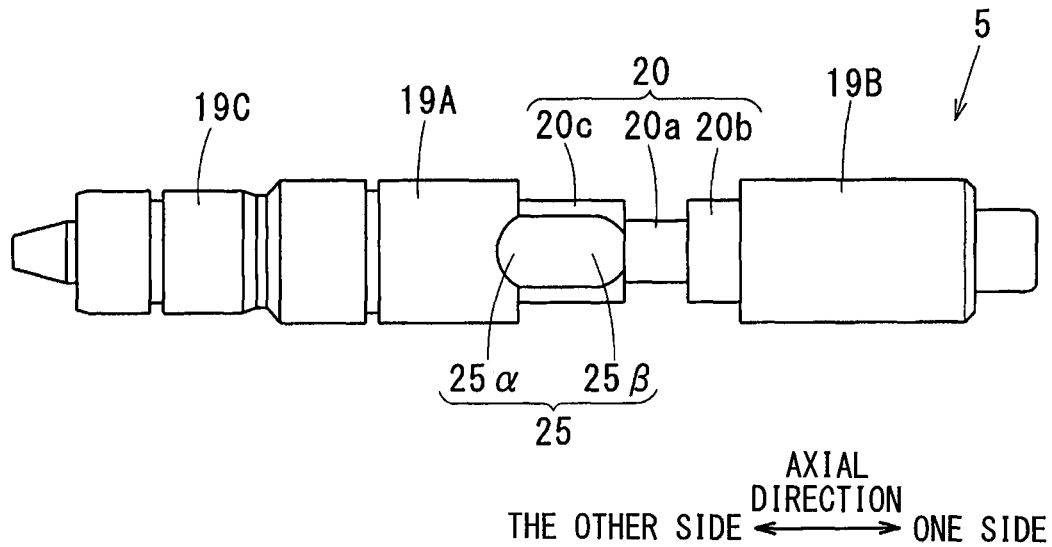
FIG. 14 is an overall view of the spool when the groove is viewed from right above (eighth embodiment)

The spool valve 1 of the eighth embodiment will be explained mainly focusing on a point different from the spool valve 1 of the first embodiment. According to the spool valve 1 of the eighth embodiment, as shown in FIG. 14, the shaft section 20 is similar to that of the aspects of the fourth and fifth embodiments. Also, out of the groove 25, in a range 25α existing in the land 19A, the width in the circumferential direction of the groove 25 becomes larger as it goes to one side in the axial direction. To be more specific, when the range 25α is viewed from right above, the other end edge in the axial direction of the range 25α appears to be a circular arc that is convex toward the other side in the axial direction.

In other words, by arranging the other end edge in the axial direction of the range 25α so as to appear to be a circular arc that is convex toward the other side in the axial direction, the width in the circumferential direction of the range 25α is made larger as it goes to one side in the axial direction. Thereby, when the communication state between the input port 12 and the output chamber 21 expands to the open side, sharp rise of the output pressure can be suppressed more. Therefore, the self-excited vibration of the spool 5 at the time of regulating the output pressure can be further suppressed.

Ninth Embodiment

Figure 15:
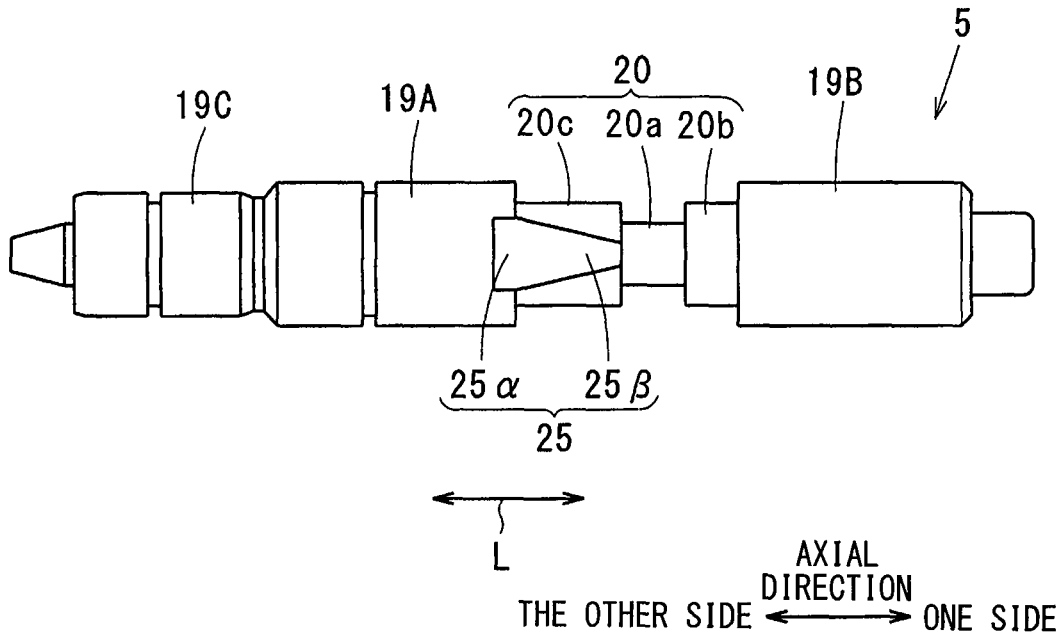
FIG. 15 is an overall view of the spool when the groove is viewed from right above (ninth embodiment)

The spool valve 1 of the ninth embodiment will be explained mainly focusing on a point different from the spool valve 1 of the first embodiment. According to the spool valve 1 of the ninth embodiment, as shown in FIG. 15, the shaft section 20 is similar to that of the aspects of the fourth, fifth, and eighth embodiments. Also, out of the groove 25, in a range 25β existing in the shaft section 20, the width in the circumferential direction of the groove 25 becomes larger as it goes to the other side in the axial direction. The flow velocity of the hydraulic oil in the groove 25 thereby becomes higher as it goes to one side in the axial direction (as it goes to the downstream side) according to Bernoulli's principle. Accordingly, drop of the flow velocity v2 in the mathematical expression 1 can be suppressed further, and therefore the flow force F1 can be further lowered.

Tenth Embodiment

Figure 16:
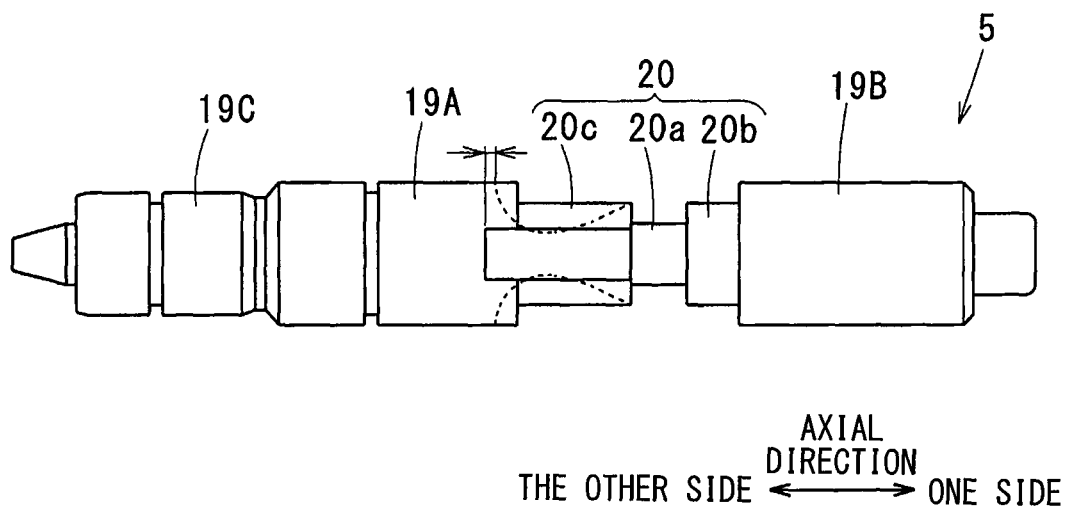
FIG. 16 is an overall view of the spool when the groove is viewed from right above (tenth embodiment)

The spool valve 1 of the tenth embodiment will be explained mainly focusing on a point different from the spool valve 1 of the first embodiment. According to the spool valve 1 of the tenth embodiment, as shown in FIG. 16, the shaft section 20 is similar to that of the aspect of the fourth embodiment. Also, according to the spool valve 1 of the tenth embodiment, the four grooves 25 exist to be apart from each other at 90° interval with respect to the circumferential direction. In other words, with respect to these four grooves 25, two combinations exist with two grooves 25 facing with each other at 180° interval in one combination.

Also, with respect to two grooves 25 configuring each combination, the position in the axial direction of the other end in the axial direction is the same, and the position in the axial direction of the other end in the axial direction is different between two combinations. Thereby, with respect to setting of the correlation characteristic between the position in the axial direction of the spool 5 and the output pressure, the degree of freedom can be increased.

Eleventh Embodiment

Figure 17A:
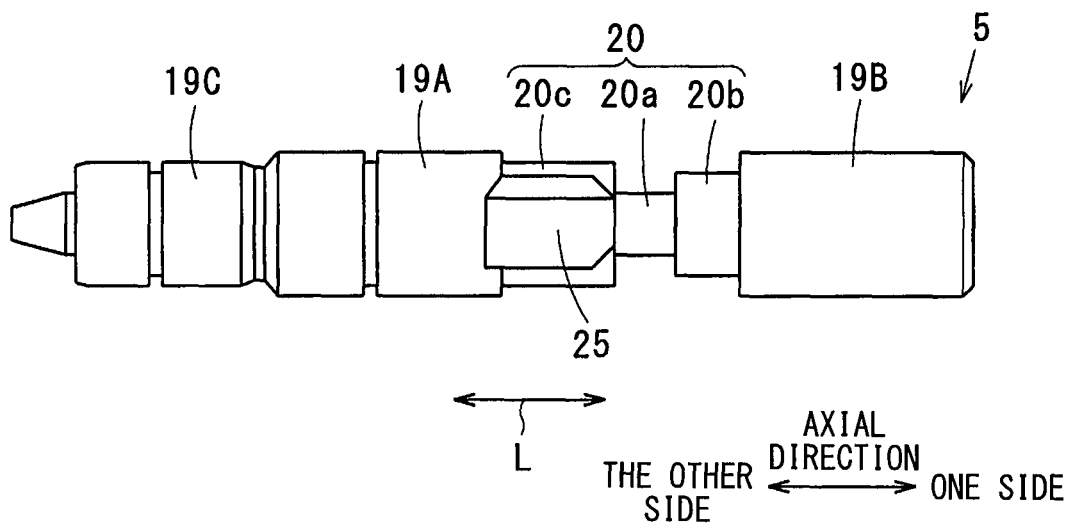
FIG. 17A is an overall view of the spool when the groove is viewed from right above (eleventh embodiment)
Figure 17B:
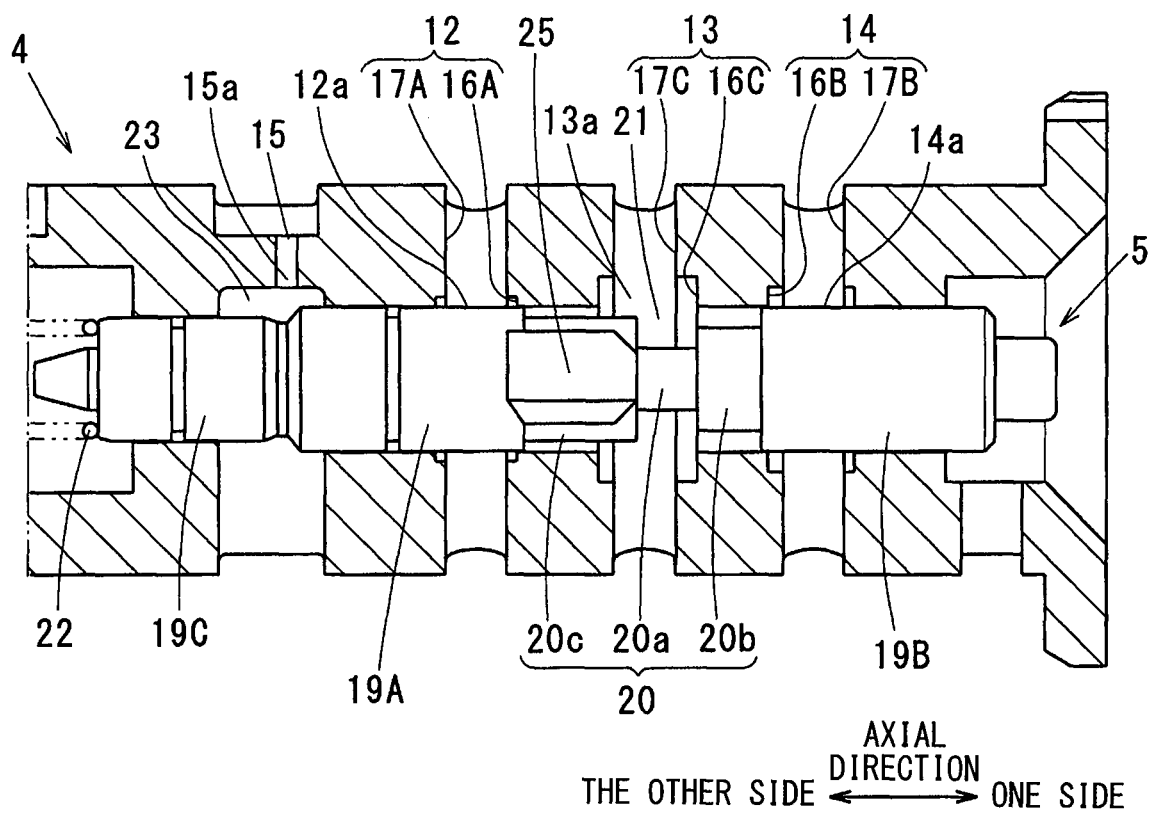
FIG. 17B is a cross-sectional view that shows a part of the spool valve as viewed from the opposite side of FIG. 17A (eleventh embodiment)

The spool valve 1 of the eleventh embodiment will be explained mainly focusing on a point different from the spool valve 1 of the first embodiment. According to the spool valve 1 of the eleventh embodiment, as shown in FIG. 17A and FIG. 17B, the shaft section 20 is similar to that of the aspect of the fourth embodiment. Also, according to the spool valve 1 of the eleventh embodiment, although each groove 25 does not have mirror image symmetry having a plane including the center in the circumferential direction of the own and the axis of the spool 5 as a symmetry plane, two grooves 25 have mirror image symmetry with each other having a separate plane including the axis of the spool 5 as a symmetry plane. Each of the grooves 25 does not have a mirror image symmetry with a plane including its center in the circumferential direction and an axis of the spool 5 serving as a symmetry plane, but the two grooves 25, in relation to each other, have a mirror image symmetry with another plane including the axis of the spool 5 serving as a symmetry plane.

The hydraulic oil having flowed in to each groove 25 can thereby have a component in the circumferential direction with respect to the flow velocity. Also, between two grooves 25, the direction of the components in the circumferential direction of the flow velocity becomes opposite to each other. Therefore, with respect to rotation around the axis of the spool 5, the rotation can be made to converge while suppressing biasing of the rotation to one direction. As a result, dispersion of the characteristic of the spool valve caused by the rotation around the axis of the spool 5 can be suppressed.

Twelfth Embodiment

Figure 18A:
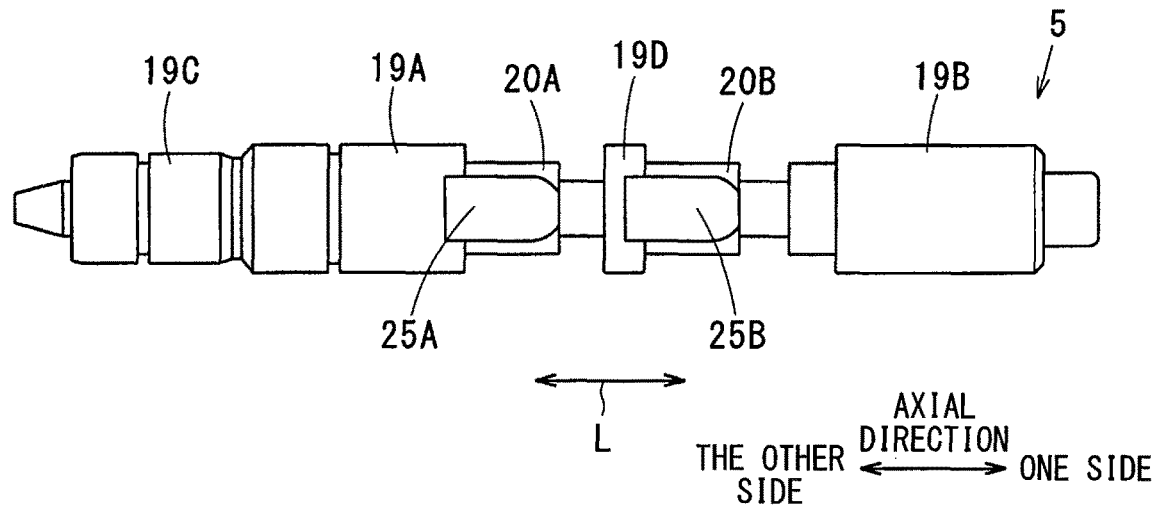
FIG. 18A is an overall view of the spool when the groove is viewed from right above (twelfth embodiment)
Figure 18B:
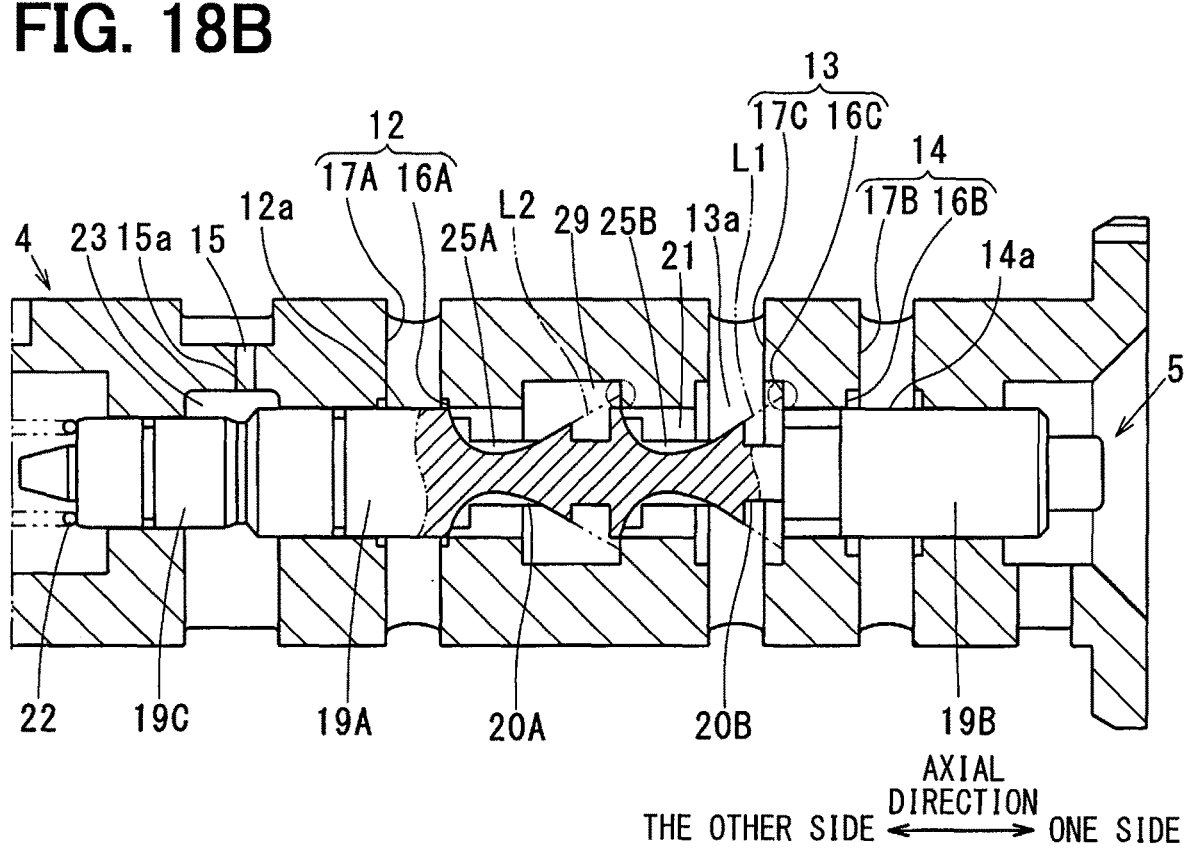
FIG. 18B is a cross-sectional view that shows a part of the spool valve (twelfth embodiment)

The spool valve 1 of the twelfth embodiment will be explained mainly focusing on a point different from the spool valve 1 of the first embodiment. With respect to the spool valve 1 of the twelfth embodiment, as shown in FIG. 18A and FIG. 18B, the flow of the hydraulic oil heading to the output port 13 from the input port 12 is throttled by two stages, and the output pressure is regulated. That is, according to the spool valve 1 of the twelfth embodiment, in the spool 5, an additional land 19D exists between the lands 19A and 19B, and the land 19D has the same diameter as that of the lands 19A and 19B. Also, shaft sections 20A and 20B exist between the lands 19A and 19D and between the lands 19D and 19B respectively, a groove 25A exists so as to extend over the land 19A and the shaft section 20A, and a groove 25B exists so as to extend over the land 19D and the shaft section 20B.

Further, aspects of the shaft section 20A and the groove 25A are similar to those of the shaft section 20 and the groove 25 of the third embodiment, and aspects of the shaft section 20B and the groove 25B are similar to those of the shaft section 20 and the groove 25 of the fourth embodiment. Also, the other side in the axial direction of the output chamber 21 is separated by the land 19D. Further, the diameter of the inner circumference of the sleeve 4 is expanded between a range where the land 19A is slidably in contact and a range where the land 19D is slidably in contact.

Also, a region where the diameter is expanded configures a middle chamber 29 that exists between the input port 12 and the output chamber 21, and one side in the axial direction and the other side in the axial direction of the middle chamber 29 are separated by the lands 19D and 19A respectively. Thereby, between the input port 12 and the output port 13, two structures for throttling the flow exist between the land 19A and the inner circumference of the sleeve 4 and between the land 19D and the inner circumference of the sleeve 4.

Also, in the spool valve 1 of the twelfth embodiment, when the position of one end in the axial direction of the opening 12*a* of the input port 12 (namely one end in the axial direction of the recess 16A) and the position of the other end in the axial direction of the groove 25A agree to each other with respect to the axial direction, the position of one end in the axial direction of the middle chamber 29 and the position of the other end in the axial direction of the groove 25B agree to each other with respect to the axial direction. In other words, the spool 5 opens the opening 12*a* to the middle chamber 29 by movement toward the other side in the axial direction of the land 19A, opens the middle chamber 29 to the output chamber 21 by movement toward the other side in the axial direction of the land 19D, and thereby makes the input port 12 and the output port 13 communicate with each other.

Therefore, in the critical state of the spool valve 1 of the twelfth embodiment, the position of one end in the axial direction of the opening 12*a* of the input port 12 and the position of the other end in the axial direction of the groove 25A agree to each other with respect to the axial direction, and the position of one end in the axial direction of the middle chamber 29 and the position of the other end in the axial direction of the groove 25B agree to each other with respect to the axial direction. Also, in this critical state, in the groove 25B, when the straight line L1 is extended to one side in the axial direction and to the outer circumference side from one end in the axial direction of the groove bottom 25*a* with the same inclination as an inclination of the groove bottom 25*a* with respect to the axial direction at one end in the axial direction of the groove bottom 25*a* without changing the direction in the circumferential direction, the straight line L1 comes up against the wall surface of the recess 16C. Thereby, since the specific extension condition is fulfilled in the critical state, in the spool valve 1 of the twelfth embodiment also, actions and effects similar to those of the spool valve 1 of the first embodiment and the like can be secured.

Further, in the groove 25A also, when the straight line L2 is extended to one side in the axial direction and to the outer circumference side from one end in the axial direction of the groove bottom 25*a* with the same inclination as an inclination of the groove bottom 25*a* with respect to the axial direction at one end in the axial direction of the groove bottom 25*a* without changing the direction to the circumferential direction, the straight line L2 comes up against a region configured of the sleeve 4 out of the wall surface of the middle chamber 29. Therefore, with respect also to the flow of the hydraulic oil in the middle chamber 29, the flow force F1 can be lowered utilizing the term of $\rho \cdot Q2 \cdot v2 \cdot \cos \theta2$ of the mathematical expression 1 effectively while suppressing increase of the flow force F2. Also, the region against which the straight line comes up is perpendicular to the axial direction.

Modifications of the embodiments described above will be described. In the present disclosure, various modifications are possible within a range not departing from the gist of the present disclosure. For example, although two output ports 13 exist to be apart from each other at 180° with respect to the circumferential direction according to the spool valve 1 of the first embodiment, even when only one output port 13 exists, the effect of lowering the flow force can be secured.

Further, although the spool valve 1 of the embodiments is of a normally-close type where the oil pressure is not outputted when the electromagnetic solenoid 6 is not energized, the effect of lowering the flow force can be secured even in the spool valve 1 of a normally-open type where the oil pressure is outputted when the electromagnetic solenoid 6 is not energized.

Further, although the spool 5 is stored within the inner circumference of the sleeve 4 and moved in the axial direction in the spool valve 1 of the embodiments, the present disclosure may be used for the spool valve 1 that does not include the sleeve 4. It is possible for example that a cylindrical space is formed in a valve body where an oil pressure circuit is arranged in the oil pressure control device 3, the input port 12 and the output port 13 are arranged at the inner wall surface of the space, and the spool 5 is inserted to this cylindrical space to allow the communication state between the input port 12 and the output port 13 to be changed.

Also, according to the spool valve 1 of the eighth embodiment, the width in the circumferential direction of the groove 25 becomes larger as it goes to one side in the axial direction only in the range 25α that exists in the land 19A out of the groove 25, however, the aspect securing actions and effects of the eighth embodiment is not limited to such an aspect. That is, such a region where the width in the circumferential direction of the groove 25 becomes larger as it goes to one side in the axial direction may be expanded to the range 25β that exists in the shaft section 20.

Figure 19A:
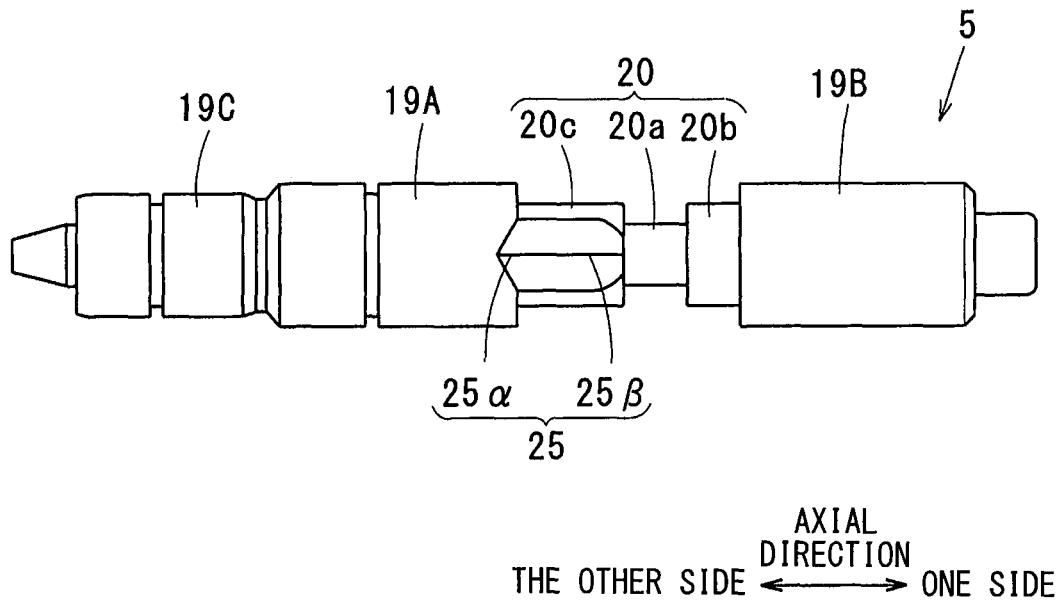
FIG. 19A is an overall view of the spool when the groove is viewed from right above (modification)
Figure 19B:
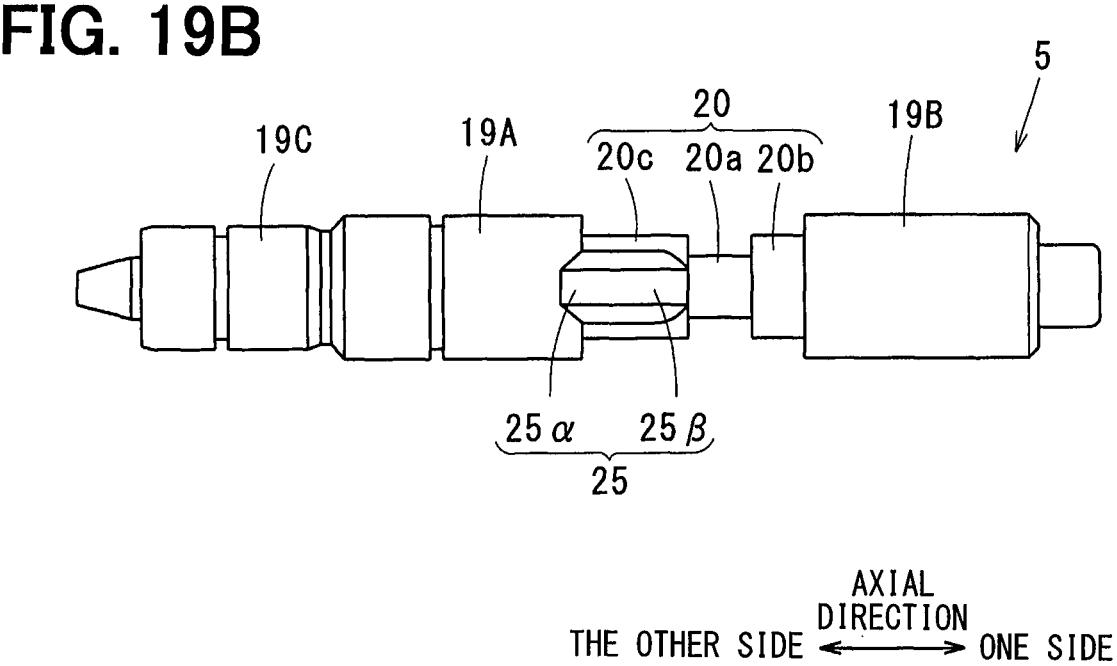
FIG. 19B is an overall view of the spool when the groove is viewed from right above (modification)

Also, according to the spool valve 1 of the eighth embodiment, the other end edge in the axial direction of the range 25α is arranged so as to appear to be a circular arc that is convex toward the other side in the axial direction, and thereby the width in the circumferential direction of the range 25α is made larger as it goes to one side in the axial direction, however, the aspect in which the width in the circumferential direction of the range 25α is made larger as it goes to one side in the axial direction is not limited to the above. For example, it is possible to arrange the other end edge in the axial direction of the range 25α so as to appear to be a triangle having an apex on the other side in the axial direction as shown in FIG. 19A, and it is also possible to arrange the other end edge in the axial direction of the range 25α so as to appear to be an isosceles trapezoid where a shorter side out of two sides that are parallel to each other is positioned on the other side in the axial direction as shown in FIG. 19B.

In the case of arranging the other end edge in the axial direction of the range 25α so as to appear to be a triangle, the other end edge may be arranged so that the groove edge appears to be a triangle when the groove edge is viewed from a cross section perpendicular to the axial direction. Also, in the case of arranging the other end edge in the axial direction of the range 25α so as to appear to be an isosceles trapezoid, the other end edge may be arranged so that the groove edge appears to be an isosceles trapezoid when the groove edge is viewed from a cross section perpendicular to the axial direction.

Further, according to the spool valve 1 of the ninth embodiment, out of the groove 25, only in the range 25β existing in the shaft section 20, the width in the circumferential direction of the groove 25 becomes larger as it goes to the other side in the axial direction, however, the aspect for securing the actions and effects of the ninth embodiment is not limited to such an aspect. That is, such a range where the width in the circumferential direction of the groove 25 becomes larger as it goes to the other side in the axial direction may be expanded to the range 25α that exists in the land 19A.

Also, according to the spool valve 1 of the tenth embodiment, the four grooves 25 exist to be apart from each other at 90° interval with respect to the circumferential direction, and the position in the axial direction of the other end in the axial direction is different between two combinations with two grooves 25 facing with each other at 180° interval in one combination, however, an aspect for securing the actions and effects of the tenth embodiment is not limited to such an aspect. That is, in order to secure the actions and effects of the tenth embodiment, a combination with different position in the axial direction of the other end in the axial direction only has to exist in plural grooves 25, and it is not required to be limited to the aspect of the tenth embodiment. Also, even when a combination with different width in the circumferential direction may exist in plural grooves 25, similar actions and effects can be secured.

Further, only one structure for throttling the flow exists between the input port 12 and the output port 13 according to the spool valve 1 of the first to eleventh embodiments, and two structures for throttling the flow exist between the input port 12 and the output port 13 according to the spool valve 1 of the twelfth embodiment. However, three or more similar structures may be arranged between the input port 12 and the output port 13.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A spool valve comprising a spool that is accommodated in a cylindrical space movably in an axial direction of the spool to change a communication state between an input port through which fluid flows in and an output port through which fluid flows out, wherein:

the input port and the output port open into the cylindrical space;

an opening of the output port and an opening of the input port exist away from each other in the axial direction on an inner wall surface that defines the cylindrical space;

the spool includes a sliding contact section that moves in sliding contact with the inner wall surface to open or close the opening of the input port;

the movement of the sliding contact section in the axial direction changes the communication state between the input port and the output port;

the spool further includes a small diameter section that has a smaller diameter than a diameter of the sliding contact section, the small diameter section having a predetermined axial length within which the diameter of the small diameter section is constant in the axial direction;

the opening of the output port is opened into an internal space that is formed between an outer peripheral surface of the small diameter section and the inner wall surface;

the sliding contact section make the opening of the input port open to the internal space by movement of the spool in the axial direction, so that the input port and the output port communicate with each other;

the spool further includes a groove on an outer peripheral surface of the spool, the groove being formed between the sliding contact section and the small diameter section in the axial direction, and the groove having a predetermined length in the axial direction and recessed radially inward of the spool;

a groove bottom of the groove in a range on one side in the axial direction including one end of the groove in the axial direction is inclined to rise further radially outward of the spool toward the one side in the axial direction;

the groove bottom of the groove in a range on the other side in the axial direction including an other end of the groove in the axial direction is inclined to rise further radially outward of the spool toward the other side in the axial direction;

the other end of the groove in the axial direction exists at the sliding contact section;

a critical state is assumed in which a position of one end of the opening of the input port in the axial direction and a position of the other end of the groove in the axial direction accord with each other with respect to the axial direction; and in the critical state, when a straight line is extended in the axial direction as well as radially outward of the spool without changing a direction of the straight line in a circumferential direction of the spool from one end of the groove bottom in the axial direction with the same inclination as the inclination of the groove bottom at the one end of the groove in the axial direction relative to the axial direction, the straight line passes through the opening of the output port to contact a wall surface of the output port.

2. The spool valve according to claim 1, wherein:
the output port includes:
a recess that is recessed radially outward of the spool from the inner wall surface; and
a passage that extends from the recess radially outward of the spool; and
the straight line contacts a wall surface of the recess.

3. The spool valve according to claim 1, wherein:
the groove extends across the sliding contact section and the small diameter section;
the one end of the groove in the axial direction exists at the small diameter section; and
the small diameter section is reduced in diameter at the one end of the groove in the axial direction, in a step-wise manner.

4. The spool valve according to claim 3, wherein:
the spool further includes another sliding contact section on one side of the small diameter section in the axial direction;
the another sliding contact section moves in sliding contact with the inner wall surface;
the internal space spreads between the sliding contact section and the another sliding contact section in the axial direction;
a part of the small diameter section further on one axial side than the one end of the groove in the axial direction includes:
a first section having a smaller diameter than a diameter of a part of the small diameter section where the groove exists; and
a second section having a larger diameter than the diameter of the first section and a smaller diameter than a diameter of the another sliding contact section; and
the second section exists on one side of the first section in the axial direction.

5. The spool valve according to claim 1, wherein:
the groove is one of two grooves that exist 180 degrees away from each other in the circumferential direction; and
the output port spreads by 180 degrees in the circumferential direction and penetrate in a radial direction of the spool.

6. The spool valve according to claim 1, further comprising a rotation restriction section that restricts rotation of the spool in the circumferential direction relative to the inner wall surface.

7. The spool valve according to claim 1, wherein the groove exists only on an outer peripheral surface of the sliding contact section.

8. The spool valve according to claim 1, wherein:
the groove includes a predetermined range that continues from the other end of the groove in the axial direction to the one side in the axial direction; and
a width of the groove in the circumferential direction becomes larger toward the one side in the axial direction in the predetermined range.

9. The spool valve according to claim 1, wherein:
the groove includes a predetermined range that continues from the one end of the groove in the axial direction to the other side in the axial direction; and
a width of the groove in the circumferential direction becomes larger toward the other side in the axial direction in the predetermined range.

10. The spool valve according to claim 1, wherein:
the groove is one of a plurality of grooves that exist at positions away from each other in the circumferential direction;
the plurality of grooves include combinations of grooves; and
axial positions of the other ends of the plurality of grooves in the axial direction are different between the combinations of grooves.

11. The spool valve according to claim 1, wherein:
the groove is one of a plurality of grooves that exist at positions away from each other in the circumferential direction;
the plurality of grooves include combinations of grooves; and
widths of the plurality of grooves in the circumferential direction are different between the combinations of grooves.

12. The spool valve according to claim 1, wherein:
the groove is one of two grooves that exist at positions away from each other in the circumferential direction;
each of the two grooves does not have a mirror image symmetry with a plane including a center of the spool in the circumferential direction and an axis of the spool serving as a symmetry plane; and
the two grooves are positioned to have a mirror image symmetry with another plane including the axis of the spool serving as a symmetry plane.

13. The spool valve according to claim 1, wherein the groove bottom is curved, and continues smoothly.

14. A spool valve comprising a spool that is accommodated in a cylindrical space movably in an axial direction of the spool to change a communication state between an input port through which fluid flows in and an output port through which fluid flows out, wherein:
the input port and the output port open into the cylindrical space;
an opening of the output port exists on one side of an opening of the input port in the axial direction away therefrom on an inner wall surface that defines the cylindrical space;
the spool includes a sliding contact section that moves in sliding contact with the inner wall surface to open or close the opening of the input port;

the movement of the sliding contact section in the axial direction changes the communication state between the input port and the output port;

the spool further includes:
- a small diameter section that has a smaller diameter than a diameter of the sliding contact section and that continues with one side of the sliding contact section in the axial direction;
- another sliding contact section that moves in sliding contact with the inner wall surface on one side of the small diameter section in the axial direction; and
- another small diameter section having a smaller diameter than a diameter of the another sliding contact section on one side of the another sliding contact section in the axial direction;

the opening of the output port is opened into an internal space that is formed between an outer peripheral surface of the another small diameter section and the inner wall surface;

another internal space is formed between the sliding contact section and the another sliding contact section;

the spool makes the opening of the input port open to the another internal space by the movement of the sliding contact section to the other side in the axial direction, and makes the another internal space open to the internal space by the movement of the another sliding contact section to the other side in the axial direction, so that the input port and the output port communicate with each other;

the spool further includes a groove on an outer peripheral surface of the spool, the groove having a predetermined length in the axial direction and recessed radially inward of the spool;

a groove bottom of the groove in a range on one side in the axial direction including one end of the groove in the axial direction is inclined to rise further radially outward of the spool toward the one side in the axial direction;

the groove bottom of the groove in a range on the other side in the axial direction including an other end of the groove in the axial direction is inclined to rise further radially outward of the spool toward the other side in the axial direction;

the other end of the groove in the axial direction exists at the sliding contact section;

a critical state is assumed in which a position of one end of the opening of the input port in the axial direction and a position of the other end of the groove in the axial direction accord with each other with respect to the axial direction; and in the critical state, when a straight line is extended to the one side in the axial direction as well as radially outward of the spool without changing a direction of the straight line in a circumferential direction of the spool from one end of the groove bottom in the axial direction with the same inclination as the inclination of the groove bottom at the one end of the groove in the axial direction relative to the axial direction, the straight line contacts a region of a wall surface that defines the another internal space, the region configured by components other than the spool.

15. The spool valve according to claim 14, wherein the groove bottom is curved, and continues smoothly.

* * * * *